(12) United States Patent
Takeno

(10) Patent No.: US 8,668,094 B2
(45) Date of Patent: Mar. 11, 2014

(54) CARBON MEMBRANE STRUCTURE AND METHOD FOR PRODUCING SAME

(75) Inventor: Shogo Takeno, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 13/613,548

(22) Filed: Sep. 13, 2012

(65) Prior Publication Data

US 2013/0001156 A1   Jan. 3, 2013

Related U.S. Application Data

(63) Continuation of application No. PCT/JP2011/050369, filed on Jan. 12, 2011.

(30) Foreign Application Priority Data

Mar. 31, 2010 (JP) ................................ 2010-082111

(51) Int. Cl.
  *B01D 69/10* (2006.01)
  *B01D 39/20* (2006.01)
  *B01D 71/02* (2006.01)
  *B01D 63/06* (2006.01)
  *B01D 61/00* (2006.01)

(52) U.S. Cl.
  USPC ............. 210/510.1; 210/503; 210/321.87; 210/321.78; 210/502.1; 210/650; 427/228; 427/244

(58) Field of Classification Search
  None
  See application file for complete search history.

(56) References Cited

U.S. PATENT DOCUMENTS

| | | | |
|---|---|---|---|
| 2002/0179519 A1* | 12/2002 | Yorita et al. | ............. 210/321.73 |
| 2006/0288677 A1 | 12/2006 | Kaigawa et al. | |
| 2008/0105613 A1 | 5/2008 | Ichikawa et al. | |
| 2008/0152865 A1 | 6/2008 | Takeno et al. | |
| 2010/0072127 A1 | 3/2010 | Ichikawa et al. | |
| 2011/0011725 A1 | 1/2011 | Tanaka et al. | |

FOREIGN PATENT DOCUMENTS

| | | |
|---|---|---|
| EP | 0 787 524 A1 | 8/1997 |
| JP | 09-313831 A1 | 12/2007 |
| WO | 2005/087355 A1 | 9/2005 |
| WO | 2008/010432 A1 | 1/2008 |
| WO | 2008/078442 A1 | 7/2008 |
| WO | 2009/001970 A1 | 12/2008 |
| WO | 2009/084521 A1 | 7/2009 |

OTHER PUBLICATIONS

International Search Report and Written Opinion dated Feb. 15, 2011.

* cited by examiner

*Primary Examiner* — Krishnan S Menon
(74) *Attorney, Agent, or Firm* — Burr & Brown, PLLC

(57) ABSTRACT

A carbon membrane structure includes: a cylindrical porous support body provided with a plurality of cells extending from one end face to the other end face and functioning as fluid passages, and a carbon membrane disposed on the surface side of the cells formed in the porous support body. The plurality of cells are formed so that a distance from one cell to another cell adjacent to the one cell in a cross section perpendicular to a cell extension direction of the porous support body 1 is 0.60 mm or more. The carbon membrane structure shows very excellent separation performance by the carbon membrane.

20 Claims, 14 Drawing Sheets

CARBON MEMBRANE STRUCTURE AND METHOD FOR PRODUCING SAME

BACKGROUND OF THE INVENTION

1. Field of the Invention

The present invention relates to a carbon membrane structure and a method for producing the same. More specifically, the present invention relates to a carbon membrane structure showing very excellent separation performance by a carbon membrane and a method for producing the same.

2. Description of Related Art

Membrane separation technology is used in the food and pharmaceutical field and the water treatment field from the viewpoints of energy saving and environmental load reduction. In recent years, there has been conducted separation of a certain component from a mixture to change the composition of the mixture as represented by the application of membrane separation technology in production of ethanol using biomass, that is, membrane separation technology of water and ethanol.

As a membrane used for such membrane separation technology, a carbon membrane can be mentioned for example. A carbon membrane is used as, for example, a structure of a carbon membrane (hereinbelow referred to as a "carbon membrane structure") disposed on a surface of a porous substrate (e.g., see Patent Document 1 to 4). As a porous substrate used for such a carbon membrane structure, there is used, for example, a monolith-shaped substrate where a plurality of cells extending from one end face to the other end face and functioning as fluid passages are formed.

In such a monolith-shaped substrate, from the viewpoint of increasing the area ratio of the carbon membrane to the capacity of the substrate, the shape has conventionally been formed so that the distance between adjacent cells is as short as possible.

PRIOR ART DOCUMENT

Patent Document

Patent Document 1: WO No. 2005/087355 pamphlet
Patent Document 2: WO No. 2008/010452 pamphlet
Patent Document 3: WO No. 2008/078442 pamphlet
Patent Document 4: WO No. 2009/001970 pamphlet

SUMMARY OF THE INVENTION

However, in such a carbon membrane structure, there has been caused a problem of deterioration in separation performance by a carbon membrane.

Specifically, a carbon membrane in a carbon membrane structure is produced by applying a carbon membrane precursor solution containing components of the carbon membrane to the surface of the cells of the monolith-shaped substrate as described above to have a membrane shape (dipping membrane formation), and the membrane-shaped carbon membrane precursor is dried. In the drying step, homogeneous carbon membrane is formed on the surfaces of the cells by evenly drying the membrane-shaped carbon membrane precursor body formed on the surfaces of the cells. However, a carbon membrane in a conventional carbon membrane structure has a problem of deterioration in separation performance due to uneven drying of the carbon membrane precursor.

The present invention has been made in view of the aforementioned problem and provides a carbon membrane structure showing very excellent separation performance by a carbon membrane and a method for producing the same.

As a result of repeated investigations into the case of the aforementioned problem by the present inventor, there has been confirmed a case where a specific portion of the carbon membrane precursor is dried first by the thermal influence from the adjacent cells, and solutes (i.e., components of the carbon membrane) in the precursor solution concentrate in the specific portion to deteriorate separation performance of a carbon membrane when the distance between adjacent cells is short. This contradicts a conventional technical common sense of considering the shape having a short distance between adjacent cells as a preferable shape for the purpose of increasing a membrane area per unit volume in a carbon membrane structure. The present inventors found out that deterioration in separation performance by the carbon membrane can be suppressed by the use of a porous support body where each distance from one cell to another cell adjacent to the one cell in a cross section perpendicular to the cell extension direction is 0.60 mm or more in a cross section perpendicular to the cell extension direction of the porous support body, and the founding has led to the completion of the present invention. More specifically, according to the present invention, the following carbon membrane structure and method for producing the same are provided.

[1] A carbon membrane structure comprising: a cylindrical porous support body provided with a plurality of cells extending from one end face to the other end face and functioning as fluid passages, and a carbon membrane disposed on the surface side of the cells formed in the porous support body; wherein the plurality of cells are formed so that a distance L from one cell to another cell adjacent to the one cell in a cross section perpendicular to a cell extension direction of the porous support body is 0.60 mm or more.

[2] The carbon membrane structure according to [1], wherein the distance L from one cell to another cell adjacent to the one cell is 0.60 to 5.00 mm.

[3] The carbon membrane structure according to [1], wherein the distance L from one cell to another cell adjacent to the one cell is 0.80 to 2.00 mm.

[4] The carbon membrane structure according to any one of [1] to [3], wherein the maximum diameter of an opening of each of the cells in a cross section perpendicular to a cell extension direction of the porous support body is 1.4 to 4.0 mm.

[5] The carbon membrane structure according to any one of [1] to [4], wherein the distances from one cell to other cells adjacent to the one cell are the same among the plurality of cells.

[6] The carbon membrane structure according to any one of [1] to [5], wherein the thickness of the carbon membrane is 0.01 to 2 μm.

[7] The carbon membrane structure according to any one of [1] to [6], wherein at least a part of the carbon membrane is formed inside the porous substrate.

[8] The carbon membrane structure according to any one of [1] to [7], wherein the carbon membrane is formed by applying a carbon membrane precursor solution having a viscosity of 1 to 5000 mPa·s to surfaces of the cells of the porous support body, drying it, and then carbonizing it.

[9] The carbon membrane structure according to any one of [1] to [8], wherein the carbon membrane is formed by applying the carbon membrane precursor solution to surfaces of the cells of the porous support body, draught drying it, and then carbonizing it.

[10] The carbon membrane structure according to [8] or [9], wherein the carbon membrane precursor solution contains at least one kind selected from the group consisting of polyimide resins and phenol resins.

[11] A method for producing a carbon membrane structure comprising: a membrane-forming step of forming a membrane made from a precursor solution on the surfaces of the cells by passing the precursor solution for forming a carbon membrane in a cylindrical porous support body provided with a plurality of cells extending from one end face to the other end face and functioning as fluid passages, a drying step of subjecting the membrane made from the precursor solution to draught drying by hot wind, and a carbonizing step of forming a carbon membrane by carbonizing the dried membrane; wherein in the membrane-forming step is used the porous support body selectively formed so that a distance L from one cell to another cell adjacent to the one cell in a cross section perpendicular to a cell extension direction of the porous support body is 0.60 mm or more.

Since a carbon membrane structure of the present invention is constituted so that each distance among plural cells formed on the porous support body is 0.60 m or more, the carbon membrane precursor is insusceptible to heat from adjacent cells in a drying step of a carbon membrane precursor for forming a carbon membrane, and the carbon membrane precursor is uniformly dried on the surfaces of the cells. Therefore, separation performance by the carbon membrane is very excellent. In addition, a method for producing a carbon membrane structure of the present invention enables to produce the aforementioned carbon membrane structure of the present invention easily.

DETAILED DESCRIPTION OF THE INVENTION

Hereinbelow, embodiments of the present invention will be described with referring to drawings. The present invention is not limited to the following embodiments, and changes, modifications, and improvements may be made as long as they do not deviate from the scope of the invention.

Figure 1:
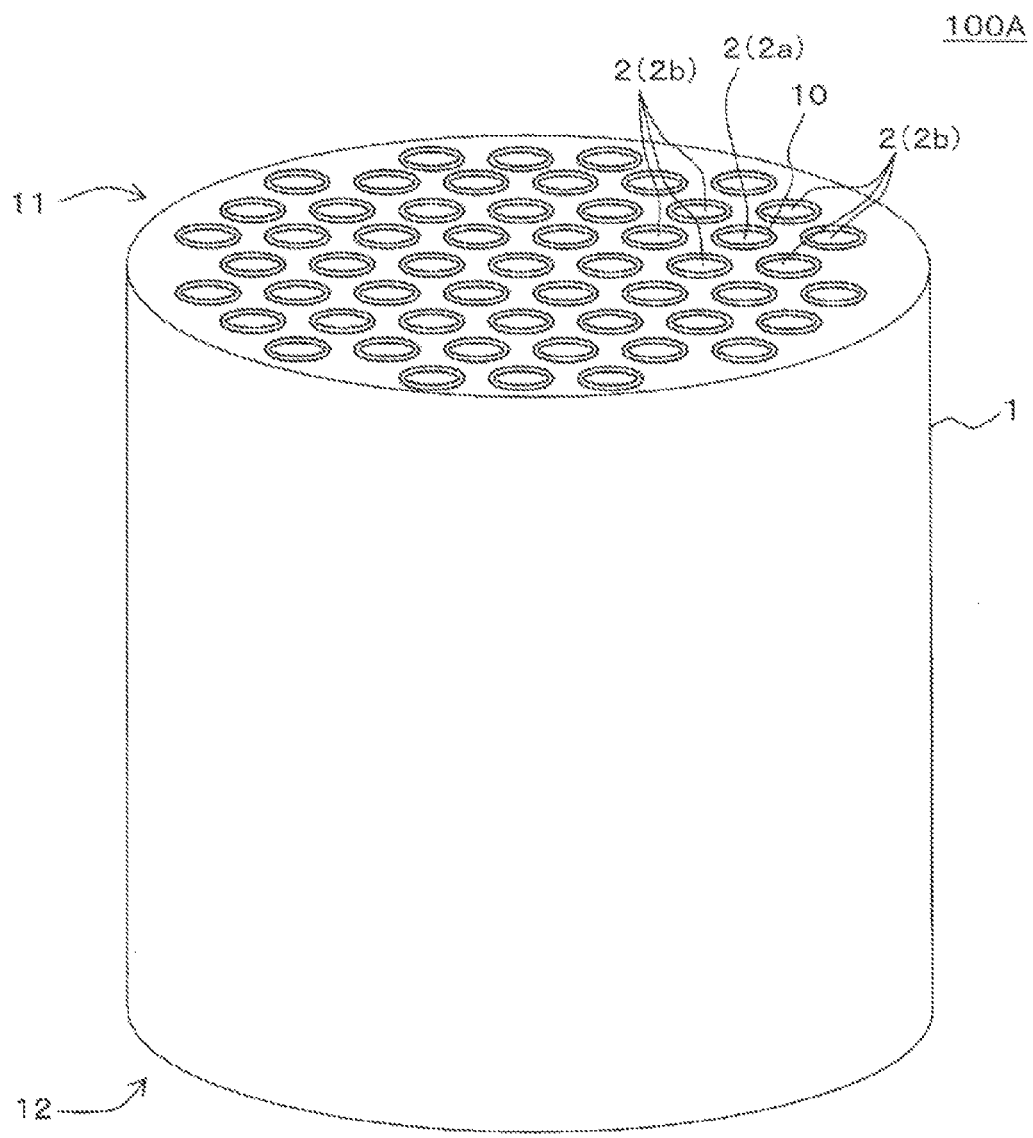
FIG. 1 is a perspective view schematically showing one embodiment of a carbon membrane structure of the present invention.
Figure 2A:
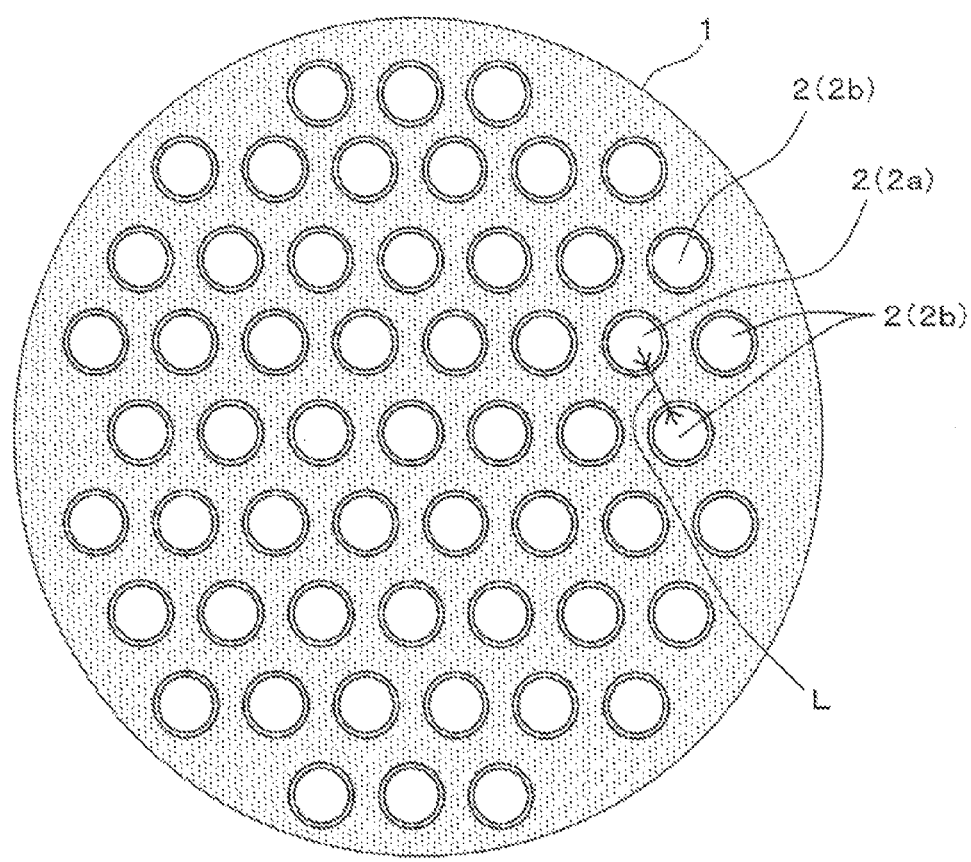
FIG. 2A is a cross-sectional view showing a cross section perpendicular to the cell extension direction of the carbon membrane structure shown in FIG. 1.
Figure 2B:
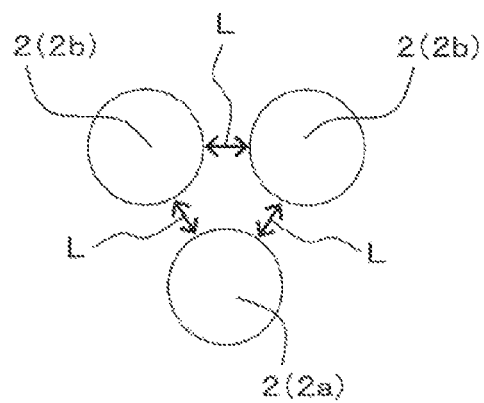
FIG. 2B is a partially enlarged view of FIG. 2A.

(1) Carbon Membrane Structure:

As shown in FIGS. 1, 2A, and 2B, one embodiment of a carbon membrane structure of the present invention is a carbon membrane structure 100 provided with a cylindrical porous support body 1 having a plurality of cells 2 extending from one end face 11 to the other end face 12 and functioning as fluid passages, and a carbon membrane 10 disposed on the surface side of the cells 2 formed in the porous support body 1. Here, FIG. 1 is a perspective view schematically showing one embodiment of a carbon membrane structure of the present invention, FIG. 2A is a cross-sectional view showing a cross section perpendicular to the cell extension direction of the carbon membrane structure shown in FIG. 1, and FIG. 2B is a partially enlarged view of FIG. 2A.

As shown in FIGS. 2A and 2B, in the carbon membrane structure 100A of the present embodiment, the plurality of cells 2 are formed so that the distance L from one cell 2a to another cell 2b adjacent to the one cell 2a in a cross section perpendicular to a cell 2 extension direction of the porous support body 1 is 0.60 mm or more. That is, in the carbon membrane structure 100A of the present embodiment, the distance L from the peripheral edge of one cell 2 (e.g., cell 2a) formed in the porous support body 1 to the peripheral edge of the nearest cell 2 (e.g., cell 2b) is formed to be 0.60 mm or more.

Figure 3A:
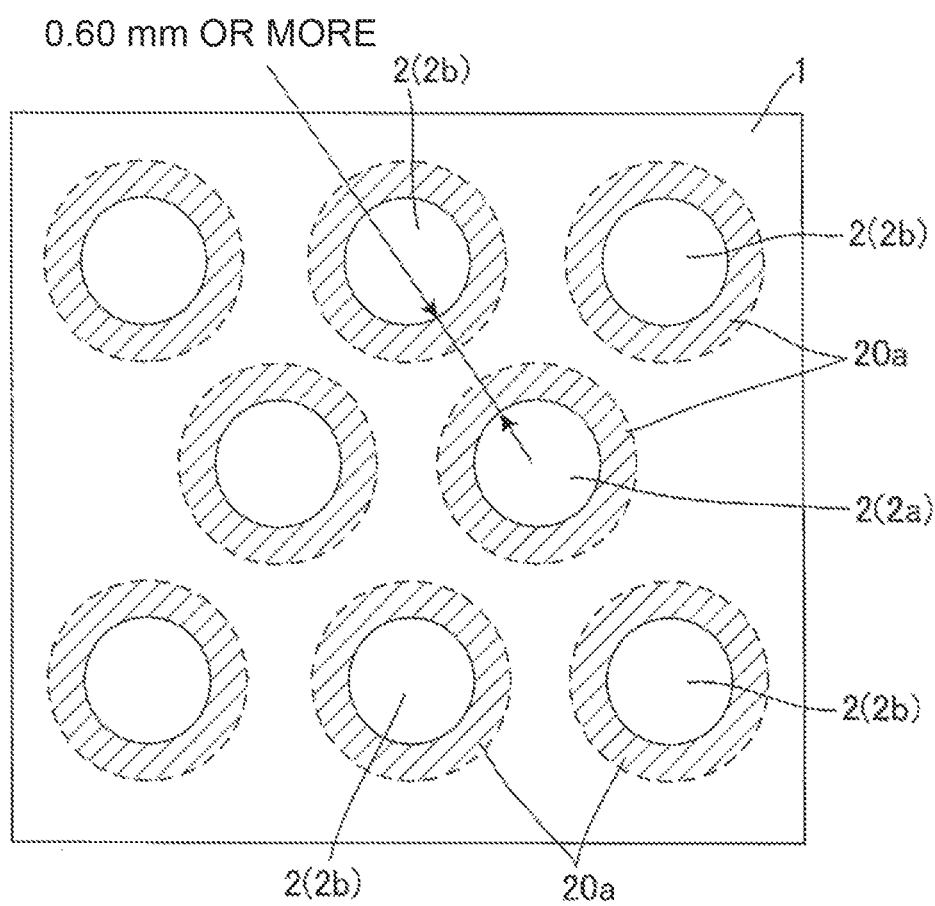
FIG. 3A is an explanatory view schematically showing a carbon membrane precursor-drying step for forming a carbon membrane upon producing the carbon membrane structure of the present embodiment.
Figure 3B:
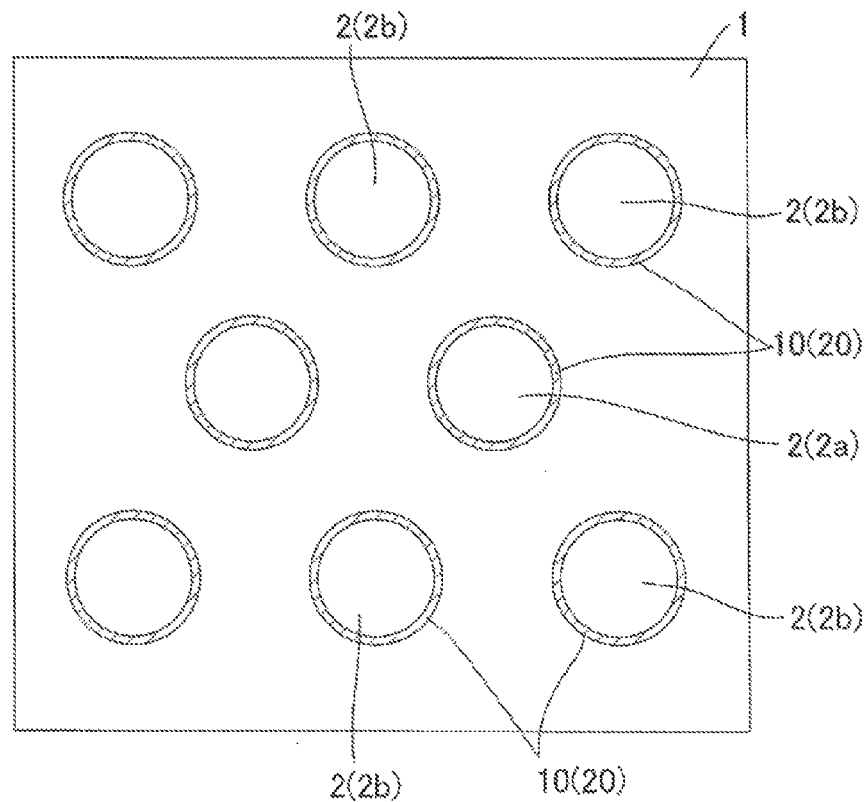
FIG. 3B is an explanatory view schematically showing a carbon membrane precursor-drying step for forming a carbon membrane upon producing the carbon membrane structure of the present embodiment.

By such constitution, as shown in FIGS. 3A and 3B, in a carbon membrane precursor-drying step for forming a carbon membrane 10, for example, upon drying the carbon membrane precursor solution 20a present on the surface of one cell 2a and the carbon membrane precursor solution 20a (hereinbelow sometimes referred to as a "precursor solution") having penetrated inside the porous support body 1 from the surface thereof, since the carbon membrane precursor 20 is insusceptible to heat from adjacent cells 2b (specifically, influence of heat traveling on the porous support body 1 from the adjacent cells 2b on the precursor solution 20a in the cell 2a), and therefore, the carbon membrane precursor 20 is uniformly dried on the surface of the cells, the separation performance of the carbon membrane 10 obtained eventually becomes very excellent. Here, FIGS. 3A and 3B are explanatory view each schematically showing the carbon membrane precursor-drying step for forming a carbon membrane upon producing a carbon membrane structure of the present embodiment. Incidentally, each of FIGS. 3A and 3B shows an enlarged cross-sectional view where a cross section perpendicular to the cell extension direction is enlarged.

More specifically, upon forming a carbon membrane, in the first place, for example, a precursor solution 20a is subjected to dipping membrane formation on the porous support body 1 and allowed to penetrate inside the porous support body 1 from the surfaces of the cells 2 formed in the porous support body 1. Next, the precursor solution 20a is dried by performing draught drying where hot wind is sent into the cells from one end face of the porous support body 1 having the precursor solution 20a having penetrated thereinto to pass the hot air through the cells, that is, the solvent of the precursor solution 20a is evaporated to obtain a densified resin layer. Then, it is subjected to a heat treatment, carbonization, and, as necessary, an oxidation-heating treatment to eventually form a carbon membrane 10.

As described above, upon evaporating the solvent of the precursor solution 20a, since solutes (i.e., components forming the carbon membrane) in the precursor solution 20a also move, the solutes move to the surface side of the cells 2 and concentrate there to be densified, and therefore a dense resin layer can be obtained on the surface side of the cells 2. Then, it is subjected to a heat treatment, carbonization, and, as necessary, an oxidation-heating treatment to eventually form a carbon membrane 10. Incidentally, for example, as the solvent of the precursor solution 20a, there can be used N-methyl-2-pyrolidone (NMP) or the like, and, as the solutes, polyamide acid, phenol resin, or the like can be used.

Figure 4A:
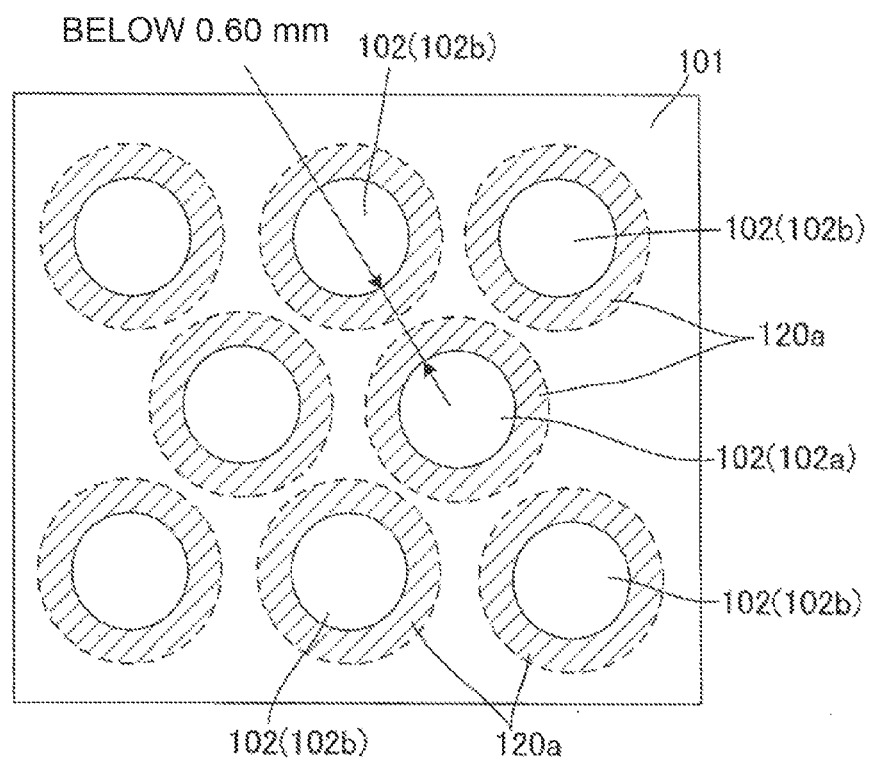
FIG. 4A is an explanatory view schematically showing a carbon membrane precursor-drying step for forming a carbon membrane upon producing a conventional carbon membrane structure.
Figure 4B:
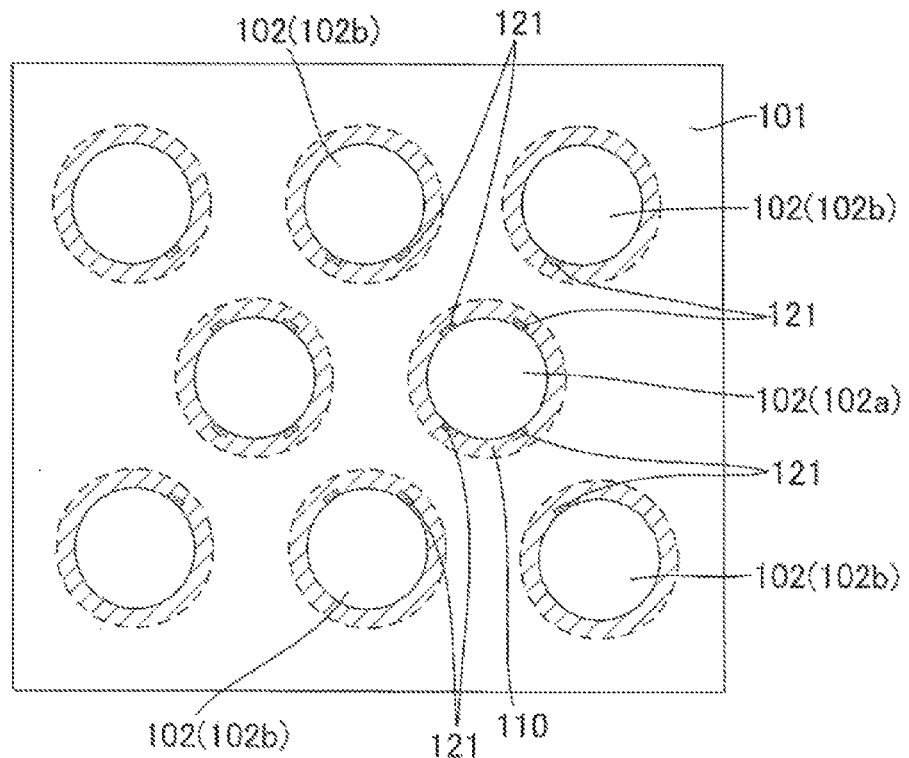
FIG. 4B is an explanatory view schematically showing a carbon membrane precursor-drying step for forming a carbon membrane.

For example, as shown in FIGS. 4A and 4B, when the distance from the peripheral edge of a cell 102 (e.g., cell 102a) formed in the porous support body 101 to the peripheral edge of the cell 102 (e.g. cell 102b) formed nearest is below 0.60 mm, a specific portion of a carbon membrane precursor (more specifically, around the region where the distance between the cell 102a to the cell 102b is below 0.60 mm) is first dried by the influence of heat from the adjacent cell, and the components 121 of a carbon membrane in the carbon membrane precursor solution 120a concentrate to make the carbon membrane 110 on the surface of the cell 102a nonhomogeneous and deteriorate the separation performance of the carbon membrane 110. That is, in terms of a drying process of one cell (e.g., one cell 102a) in FIG. 4A, a portion closer to adjacent cells (e.g., other 6 cells 102b adjacent to the cell 102a in FIG. 4A) is more susceptible to heat from the cells 102b, and evaporation is more active there. As a result, as shown in FIG. 4B, the solutes (components 121 of a carbon membrane) concentrate more in the portion closer to the adjacent cells 102b, and unevenness in solute density is caused in the periphery (horizontal directions of the cell 102a) of the cell 102a. This unevenness serves as the unevenness of the carbon membrane 110 to influence on the separation performance. In the present invention, the surface of the cell means an inner peripheral face (inside face) having cells formed therein of the porous support body.

Here, FIGS. 4A and 4B are explanatory view each schematically showing a carbon membrane precursor-drying step for forming a carbon membrane upon producing a conventional carbon membrane structure. Incidentally, each of FIGS. 4A and 4B shows an enlarged cross-sectional view where a cross section perpendicular to the cell extension direction is enlarged.

In the carbon membrane structure of the present embodiment, the "distance L" from one cell to another cell adjacent to the one cell means the minimum distance between the one cell and the cell adjacent to the one cell. That is, as shown in FIGS. 2A and 2B, it means the distance L from the peripheral edge of a cell 2 (e.g. cell 2a) formed in the porous support body 1 to the peripheral edge of the cell 2 (e.g. cell 2b) formed in the nearest position.

In the present specification, the cell arrangement in the case that a plurality of cells are disposed (formed) so that the center of each cell is located at the position corresponding to each intersection of a square lattice in a cross section of the porous support body is sometimes called a "lattice pattern". The cell arrangement in the case that a plurality of cells are disposed (formed) so that the center of each cell is located at the position corresponding to each intersection of an equilateral-triangular lattice in a cross section of the porous support body is sometimes called a "staggered pattern". For example, the cell arrangement in FIG. 2A is called a "staggered pattern". In this arrangement of a staggered pattern, the number of adjacent cells 2b formed in the nearest positions with respect to one cell 2a is six.

Figure 5A:
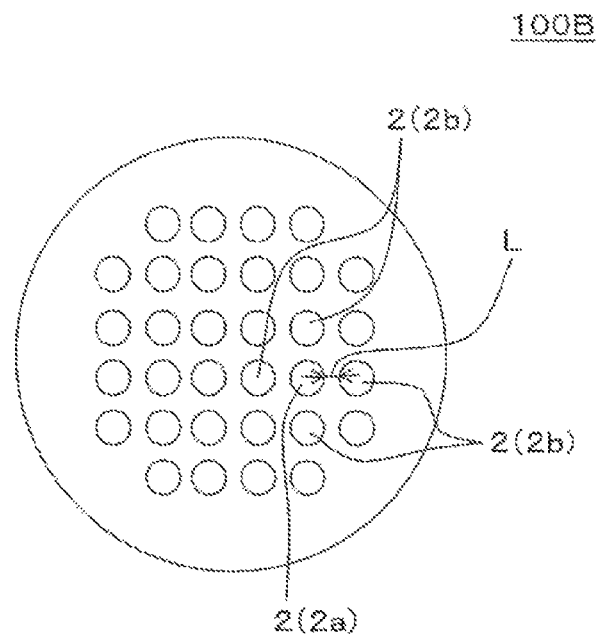
FIG. 5A is a cross-sectional view showing a cross section perpendicular to the cell extension direction of another embodiment of a carbon membrane structure of the present invention.
Figure 5B:
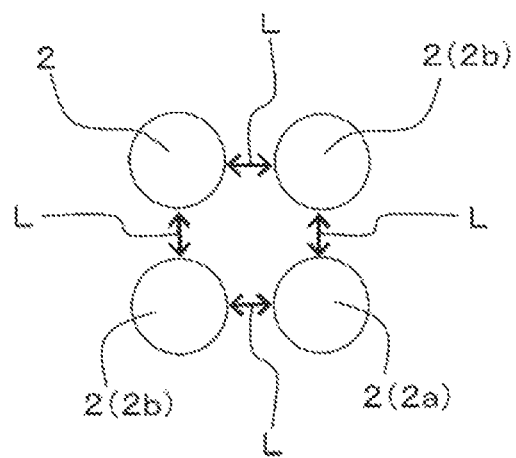
FIG. 5B is a partially enlarged view of FIG. 5A.

In the carbon membrane structure of the present embodiment, as shown in FIGS. 5A and 5B, circular cells 2 may be disposed in a lattice pattern. Here, FIG. 5A is a cross-sectional view showing a cross section perpendicular to the cell extension direction of another embodiment of a carbon membrane structure of the present invention, and FIG. 5B is a partially enlarged view of FIG. 5A. In such a carbon membrane structure 100B, four other cells 2b are formed adjacently in the nearest positions with respect to one cell 2a. In a carbon membrane structure of the present invention, the cell arrangement is not limited to the above "lattice pattern" and "staggered pattern", and other shapes may be employed as long as the distance from one cell to other cells adjacent to the one cell is 0.60 mm or more. For example, the cells may be arranged irregularly as long as every distance Z among the cells is 0.60 mm or more.

Hereinbelow, each constituent of the carbon membrane structure of the present embodiment will be described in more detail.

(1-1) Porous Support Body:

The porous support body has cylindrical porous body having a plurality of cells extending from one end face to the other, end face and functioning as fluid passages formed therein and is used as a support body (sometimes referred to as a substrate) for supporting a membrane on the surface side of each of the cells. Such a cylindrical porous body where a plurality of cells are formed is sometimes referred to as a monolith substrate. That is, the "monolith substrate" means a lotus root-shaped or honeycomb-shaped substrate (support body) where a plurality of cells extending from one end face to the other end face are formed.

There is no particular limitation on the material for the porous support body as long as it has sufficient strength, permeability, corrosion resistance, and the like, and, for example, metal or ceramic may be used. When a porous support body made of ceramic is used, preferable examples include alumina, silica, cordierite, zirconia, mullite, and titania.

Though the porous support body may be constituted of the same material and particles, it may be constituted of a plural materials and particles. For example, the porous support body may be constituted in such a manner that an intermediate layer constituted of other material and particles is disposed on the surface of the porous body and that a surface layer constituted of still other material and particles is further disposed on the intermediate layer. Here, it is preferable that the average particle diameter of the particles constituting the intermediate layer is smaller than that of the particles constituting the porous body. Furthermore, it is preferable that the particle diameter of the particles constituting the surface layer is smaller than that of the particles constituting the intermediate layer.

The porous support body can be formed by, for example, firing a formed body formed by extrusion or the like with employing alumina particles having an average particle diameter of, for example, 10 to 100 μm as the material. The porous support body is provided with a plurality of pores passing through from the front to the back and having an average pore size of 1 to 30 μm.

Next, the intermediate layer and the surface layer disposed as necessary will be described. The intermediate layer is formed by forming a membrane on the surface of the porous body by a filtration membrane formation method with alumina particles having an average particle diameter of, for example, 0.3 to 10 μm and then firing the membrane (layer). The intermediate layer has a plurality of pores having an average pore size of, for example, 0.1 to 3 μm. The surface layer is formed by forming a membrane on the surface of the intermediate layer by a filtration membrane formation method with alumina particles having an average particle diameter of, for example, 0.03 to 1 μm and then firing the membrane (layer). The surface layer has a plurality of pores having an average pore size of, for example, 0.01 to 0.5 μm.

Figure 6A:
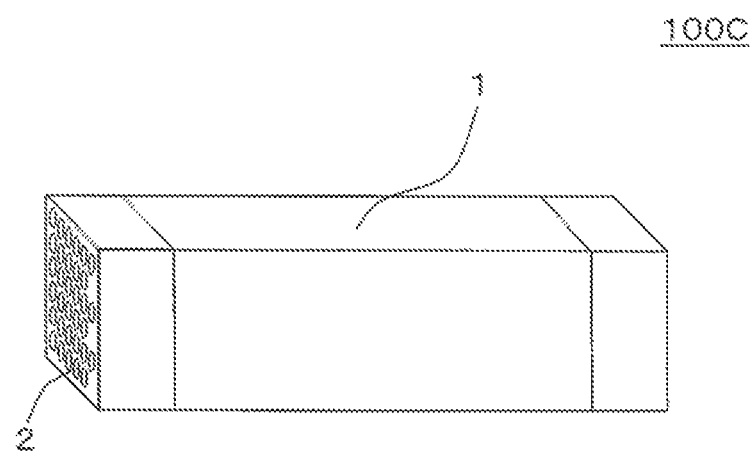
FIG. 6A is a perspective view schematically sowing still another embodiment of a carbon membrane structure of the present invention.
Figure 6B:
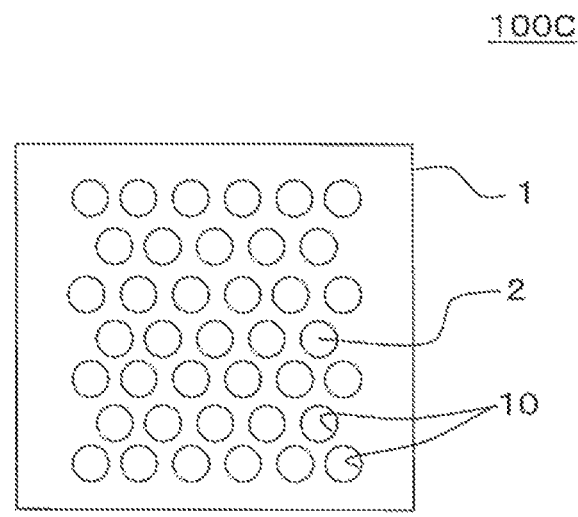
FIG. 6B is a cross-sectional view showing a cross section perpendicular to the cell extension direction of the carbon membrane structure shown in FIG. 6A.

There is no particular limitation on the entire shape of the porous support body, and it is preferable that the shape of a cross section perpendicular to the cell extension direction is circular or polygonal. For example, though FIG. 1 shows an example of the case where the entire shape of the porous support body 1 is circular columnar, the entire shape of the porous support body 1 may be rectangular parallelepiped as the carbon membrane structure 100C shown in FIGS. 6A and 6B. Here, FIG. 6A is a perspective view schematically showing still another embodiment of a carbon membrane structure of the present invention, and FIG. 6B is a cross-sectional view showing a cross section perpendicular to the cell extension direction of the carbon membrane structure shown in FIG. 6A.

Though the length in the central axial direction (i.e., length in the cell extension direction) of the porous support body may appropriately be determined according to the use of the carbon membrane structure, for example, the length is preferably 10 to 2000 mm, more preferably 40 to 1000 mm.

In addition, when the shape of a cross section of the porous support body is circular, the radius is preferably 5 to 150 mm, more preferably 10 to 100 mm. In addition, when the shape of a cross section of the porous support body is polygonal, the half length of the maximum diagonal line in the polygon is preferably about the same as the aforementioned radius. Incidentally, a preferable range of the size of a cross section of the porous support body should be determined according to the number of the cells formed in the porous support body and the distance(s) L among the cells.

In addition, the porous support body has a porosity of preferably 25 to 55%, more preferably 25 to 40%. When the porosity of the porous support body is below 25%, permeability upon separating the components to be separated from the mixture may be deteriorated. When it is above 55%, strength of the porous support body may be deteriorated. Incidentally, the "porosity" is a value measured by the Archimedes method.

In addition, it is preferable that a porous support body used for the carbon membrane structure of the present embodiment has a sealing portion formed by applying a glass paste on both the end faces of the porous support body and heating it at predetermined temperature. The sealing portion can inhibit gas, liquid, microparticles, and the like from moving from the inside of the porous support body to the outside or from the outside to the inside of the porous support body and can appropriately be formed in the portions where the movement of the aforementioned gas, liquid microparticles, and the like is inhibited.

In addition, the porous support body used for the carbon membrane structure of the present embodiment may be provided with a slit-shaped gap portion (hereinbelow referred to as a "slit") formed so as to pass through the porous support body in the direction perpendicular to the longitudinal direction (cell extension direction) of the porous support body. For example, as shown in FIGS. 7A to 7D, the slit-shaped gap portions (slits 30) can be formed by cutting away a part of the cells so as to communicate with the external space in a part of the plural cell rows. There are shown examples where slit-shaped gaps (slits 30) are formed so as to pass through the porous support body 1 in the direction perpendicular to the longitudinal direction (cell extension direction) of the porous support body 1.

Figure 7A:
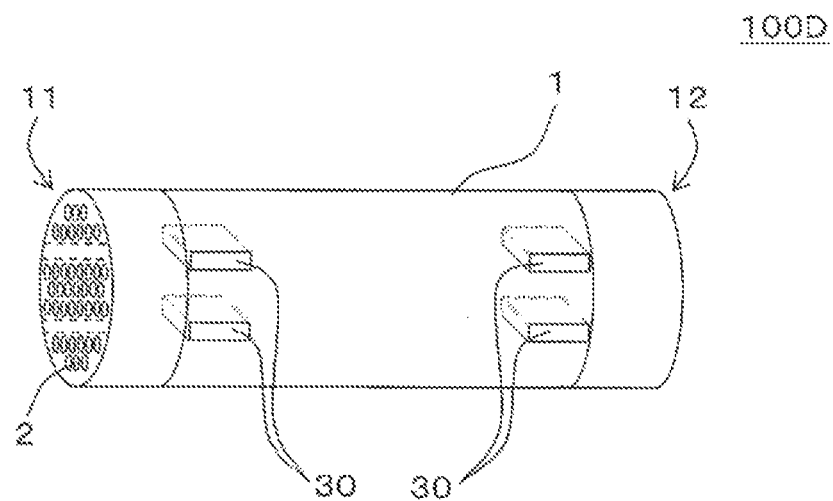
FIG. 7A is a perspective view schematically showing still another embodiment of a carbon membrane structure of the present invention.
Figure 7B:
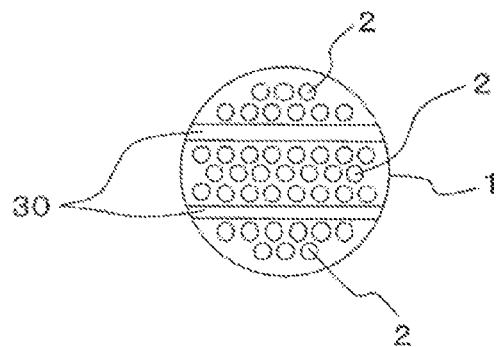
FIG. 7B is a cross-sectional view showing a cross section perpendicular to the cell extension direction of the carbon membrane structure shown in FIG. 7A.
Figure 7C:
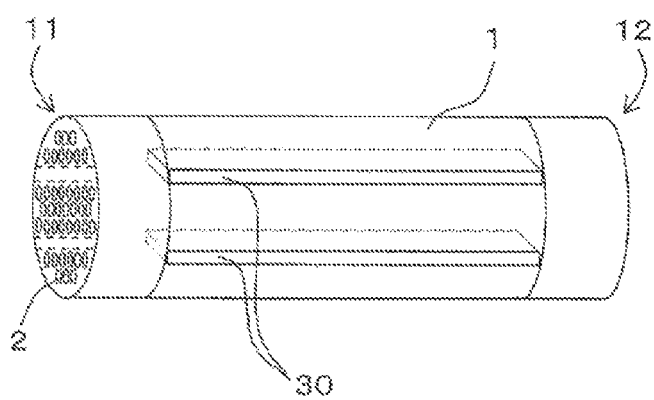
FIG. 7C is a perspective view schematically showing still another embodiment of a carbon membrane structure of the present invention.
Figure 7D:
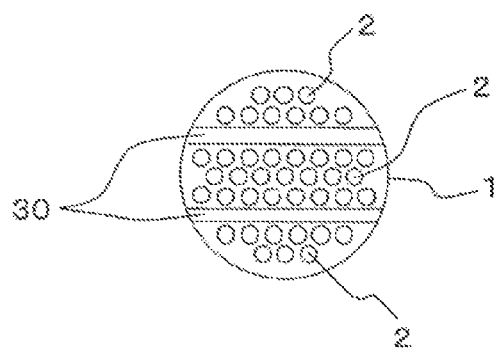
FIG. 7D is a cross-sectional view showing a cross section perpendicular to the cell extension direction of the carbon membrane structure shown in FIG. 7C.

Here, regarding the cells cut away so as to communicate with the external space, it is necessary to seal the openings at the substrate edge ends airtightly. This enables to inhibit a mixture solution containing the component to be separated from being mixed with the permeated solution containing the component to be separated and causing pollution. The sealing of the cells can be performed by, for example, a method where a plugging member of the same material as that for the substrate is filled into the cell edge end portion, and the end face of the substrate is covered with a glass-like material and fired. The plugging member and the member for sealing may employ the same material. In a porous support body where a slit-shaped gap is thus provided, the permeation amount upon separating the component to be separated can be increased. Here, FIG. 7A is a perspective view schematically showing still another embodiment of a carbon membrane structure of the present invention, and FIG. 7B is a cross-sectional view showing a cross section perpendicular to the cell extension direction of the carbon membrane structure shown in FIG. 7A. FIG. 7C is a perspective view schematically showing still another embodiment of a carbon membrane structure of the present invention, and FIG. 7D is a cross-sectional view showing a cross section perpendicular to the cell extension direction of the carbon membrane structure shown in FIG. 7C.

The carbon membrane structure 100D shown in FIGS. 7A and 7B shows an example where two slits 30 passing through from one outer peripheral face of the porous support body 1 to another outer peripheral face are formed on one end face 11 side of the porous support body 1 and where two slits 30 passing through from one outer peripheral face of the porous support body 1 to another outer peripheral face are formed on the other end face 12 side of the porous support body 1. In addition, the carbon membrane structure 100I shown in FIGS. 7C and 7D shows an example where two slits 30 passing through the porous support body 1 are formed in the outer peripheral portions from one end face 11 side toward the other end face 12 side of the porous support body 1. Incidentally, it is possible to appropriately change the formation positions and the number of the slits 30 in accordance with the shape, the size, and the like of the porous support body 1.

(1-2) Cell:

In the plural cells formed in the porous support body, a carbon membrane is disposed on the surface side, and a mixture containing a component to be separated is passed through the cells to separate the component to be separated by the carbon membrane.

As described above, in the carbon membrane structure of the present embodiment, the plural cells are formed so that the distance L from one cell to another cell adjacent to the one cell is 0.60 mm or more in a cross section perpendicular to the cell extension direction of a porous substrate. In the carbon membrane structure of the present embodiment, the distance L to another cell adjacent to one cell is preferably 0.60 to 5.00 mm, more preferably 0.80 to 2.00 mm. By specifying the aforementioned distance L to 0.60 to 5.00 mm, it is possible to enhance the separation performance by increasing the area ratio of the carbon membrane as much as possible while suppressing decrease in separation performance of the carbon membrane.

Figure 8A:
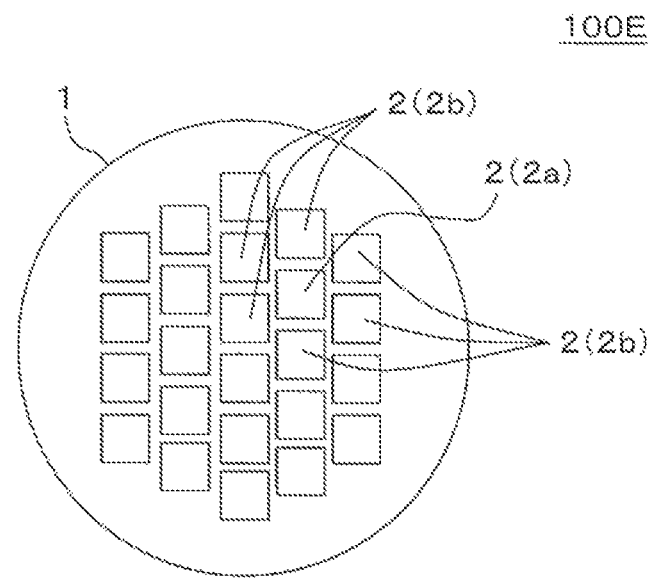
FIG. 8A is a cross-sectional view showing a cross section perpendicular to the cell extension direction of still another embodiment of a carbon membrane structure of the present invention.
Figure 8B:
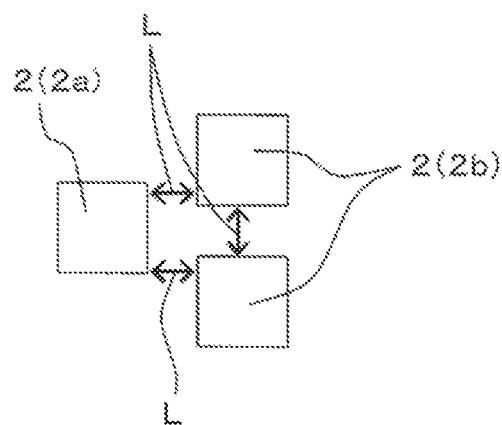
FIG. 8B is a partially enlarged view of FIG. 8A.
Figure 9A:
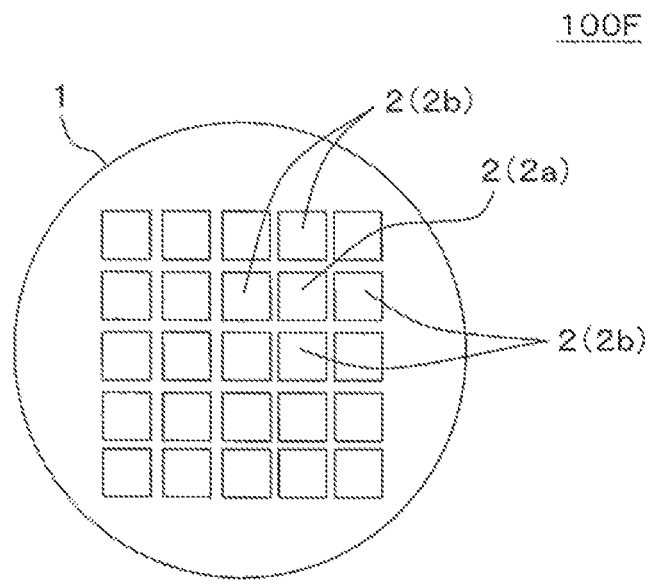
FIG. 9A is a cross-sectional view showing a cross section perpendicular to the cell extension direction of still another embodiment of a carbon membrane structure of the present invention.
Figure 9B:
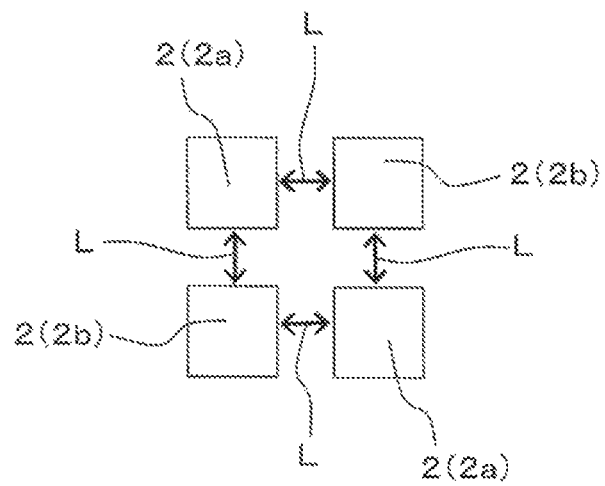
FIG. 9B is a partially enlarged view of FIG. 9A.
Figure 10A:
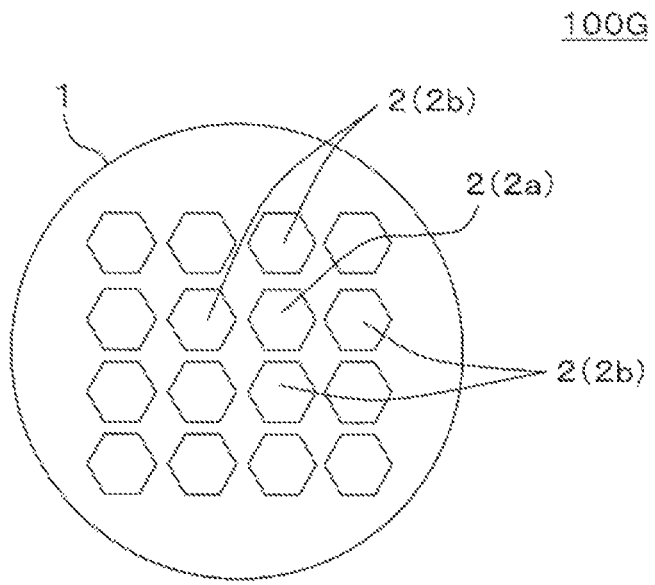
FIG. 10A is a cross-sectional view showing a cross section perpendicular to the cell extension direction of still another embodiment of a carbon membrane structure of the present invention.
Figure 10B:
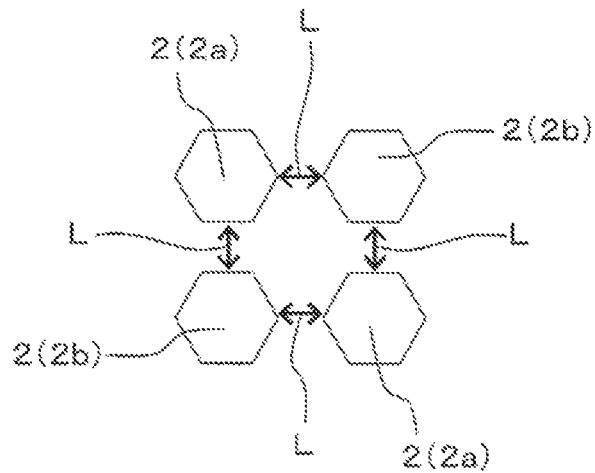
FIG. 10B is a partially enlarged view of FIG. 10A.
Figure 11A:
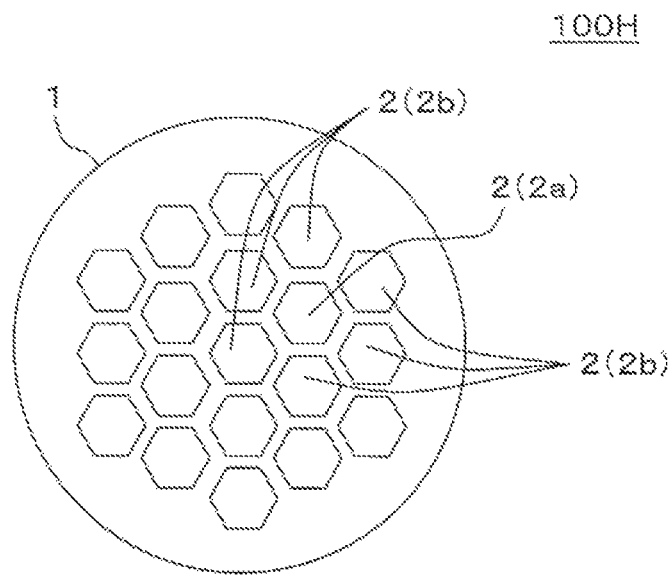
FIG. 11A is a cross-sectional view showing a cross section perpendicular to the cell extension direction of still another embodiment of a carbon membrane structure of the present invention.
Figure 11B:
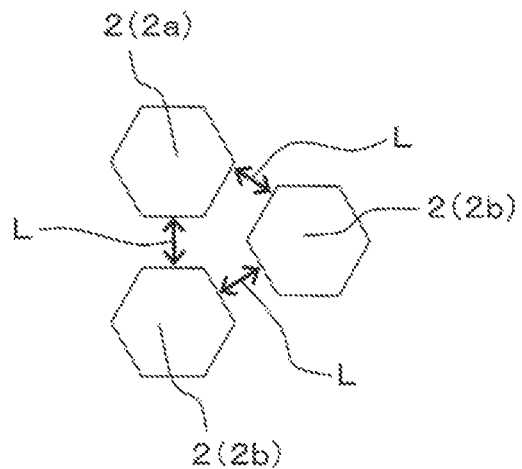
FIG. 11B is a partially enlarged view of FIG. 11A.
Figure 12A:
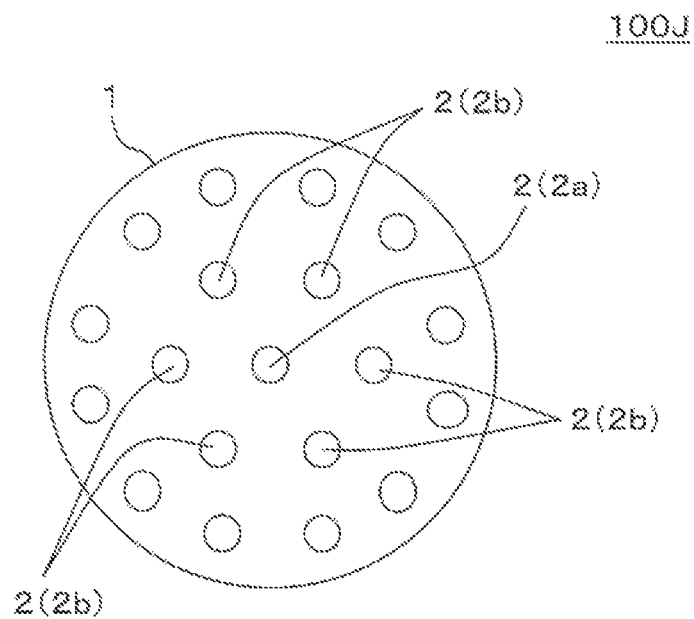
FIG. 12A is a cross-sectional view showing a cross section perpendicular to the cell extension direction of still another embodiment of a carbon membrane structure of the present invention.
Figure 12B:
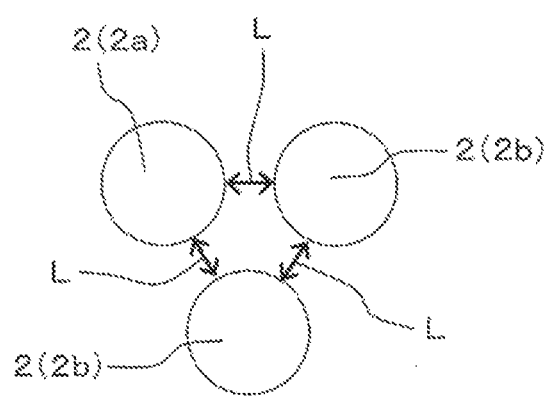
FIG. 12B is a partially enlarged view of FIG. 12A.

There is no particular limitation on the cell shape, and the cell shape (i.e., shape of the openings of the cells in a cross section) may be, for example, circular as shown in FIGS. 1 and 2A. For example, the shape may be polygonal such as triangular, quadrangular, hexagonal, and octagonal; elliptic; or the like. For example, the carbon membrane structure 100E shown in FIGS. 8A and 8B shows an example of a case where quadrangular cells 2 are formed in a staggered pattern, and the carbon membrane structure 100F shown in FIGS. 9A and 9B shows an example of a case where quadrangular cells 2 are formed in a lattice pattern. In addition, the carbon membrane structure 100G shown in FIGS. 10A and 10B shows an example of a case where hexagonal cells 2 are formed in a lattice pattern, the carbon membrane structure 100H shown in FIGS. 11A and 11B shows an example of a case where hexagonal cells 2 are formed in a staggered pattern, and the carbon membrane structure 100J shown in FIGS. 12A and 12B shows an example of a case where circular cells 2 are formed in a staggered pattern with the distance L among the cells is wider (longer) than that of the carbon membrane structure 100A shown in FIGS. 2A and 2B. Here, FIGS. 8A, 9A, 10A, 11A, and 12A are cross-sectional views each showing a cross section perpendicular to the cell extension direction of still another embodiment of a carbon membrane structure of the present invention, and FIGS. 8B, 9B, 10B, 11B, and 12B are partially enlarged views of FIGS. 8A, 9A, 10A, 11A, and 12A, respectively.

There is no particular limitation on the size of each cell. For example, the maximum diameter of the opening of the cell in a cross section perpendicular to the cell extension direction of the porous support is preferably 1.0 to 6.0 mm, more preferably 1.2 to 5.0 mm, particularly preferably 1.4 to 4.0 mm. Such constitution enables to obtain a carbon membrane structure excellent in permeability upon separating a component to be separated from a mixture. Here, when the cell shape is not circular, the maximum diameter means a diameter of the minimum circle containing the cell shape inside thereof.

There is no particular limitation on the number of the cells formed in the porous support body, and the number of the cells can appropriately be determined in accordance with the size of a cross section of the porous support as long as the distance L between adjacent cells is 0.60 mm or more.

In addition, though there is no particular limitation, the distance L to other cells adjacent to the one cell is preferably the same among the plural cells. That is, it is preferable that all cells are disposed so that the distances from one cell to the nearest cell adjacent to the one cell are the same. This constitution enables the separation performance of the carbon membrane disposed on the surface of each cell to be uniform and gives a carbon membrane structure excellent in separation performance.

(1-3) Carbon Membrane:

The carbon membrane is a separation membrane made of carbon substantially and is obtained by carbonizing a carbon-containing layer (carbon membrane precursor) obtained by drying a precursor solution containing carbon by thermal decomposition in an oxygen-inert atmosphere. Such a carbon membrane is a separation membrane capable of separating a specific component from a mixture. In the present specification, "made of carbon substantially" means that carbon is contained at a mass ratio of 50% or more. It is preferable that a carbon membrane used for the carbon membrane structure of the present embodiment contains carbon at a mass ratio of 65 to 100%.

The aforementioned carbon-containing layer is preferably a resin layer. As the precursor to obtain a carbon membrane by thermal decomposition, there is no particular limitation as long as it is a carbon-containing resin such as vinyl chloride resin, vinylidene chloride, vinyl chloride copolymer, vinyl acetate resin, polyvinyl alcohol, polyvinyl acetal, polyethylene, polypropylene, styrene resin (polystyrene), acrylic resin, polyamide, polyethylene terephthalate, polycarbonate, fluororesin, urea resin, melamine resin, epoxy resin, or silicon resin. However, preferable examples are polyimide-based resin and phenol-based resin.

The carbon membrane is formed on the surface side of the cells, and the state of the membrane to be formed depends on the pore size and the surface roughness of the ground where the carbon membrane is formed (i.e., porous support body) and the membrane-forming conditions for the carbon membrane. For example, there is a case of forming a carbon membrane on the entire surface of each cell formed in the porous support body, and there is a case of forming it in the inside portion from the surface of the cell (i.e., internal portion of the porous support body). Further, it may be formed on a part of the surface of the cell and in the internal portion of the porous support body. Thus, the disposition state of the carbon membrane may be on the surface or in the internal portion of the cell as long as desired separation characteristics are exhibited.

When the carbon membrane is formed on the surface of each cell, the membrane thickness is preferably 0.01 to 2 μm, more preferably 0.05 to 1 μm. When it is smaller than 0.01 μm, a defect may be caused in the membrane. When it is larger than 2 μm, the permeability upon separation may be deteriorated. The average pore size of the carbon membrane is preferably 0.2 to 100 nm, more preferably 0.2 to 10 nm.

In addition, the carbon membrane is preferably formed by forming a membrane on surfaces of the cells of the porous support body with a carbon membrane precursor solution having a viscosity of 1 to 5000 mPa·s (more specifically, dipping membrane formation) and drying it to obtain a densified resin layer, which is then subjected to a thermal treatment, carbonization, and an oxidation-heat treatment as necessary. In the case of forming a carbon membrane by the use of a precursor solution having such a viscosity, the aforementioned decrease in separation performance can effectively be inhibited by the use of a porous support body where the distance L to another cell adjacent to one cell is 0.60 mm or more.

The aforementioned oxidation-heat treatment means that the carbon membrane is kept in a heating furnace where mixed gas containing oxidizing gas is circulated. For example, the oxidation-heat treatment can be performed by putting the carbon membrane structure having a carbon membrane formed therein in the heating furnace.

As the oxidizing gas used for the oxidation-heat treatment, there can be used water vapor, carbon dioxide, or a mixed gas of them and a gas inert against carbon, such as nitrogen, argon, or helium. However, in the case of these gases, since high temperature is necessary to obtain an effect in comparison with the case of using oxygen, a gas containing oxygen is more preferable as the oxidizing gas.

The temperature of the oxidation-heat treatment is preferably 250 to 450° C., more preferably 300 to 400° C. When it is below 250° C., it is difficult of obtain the effect of the oxidation-heat treatment. When it is above 450° C., the carbon layer disappears due to oxidizing gas, and it may be impossible to obtain sufficient separation performance. The oxidation-heat treatment time is preferably 0.1 to 10 hours.

Regarding the constitution of the carbon membrane, there is no limitation on the aforementioned carbon membrane, and a conventionally known carbon membrane and a carbon membrane used for a carbon membrane structure can be used.

The evaluation on separation performance of a carbon membrane can be conducted by varying the composition of a mixture. As a specific method, there may be a method where a mixture is supplied as a liquid to perform gas permeation (pervaporation method) or a method where a liquid is completely evaporated once by heating to perform gas permeation (vapor permeation method). Alternatively, a liquid may be heated until a part is evaporated to perform gas permeation. Such methods enable to perform evaluation on the separation performance of the carbon membrane.

(2) Method for Producing a Carbon Membrane Structure:

Next, an embodiment of a method for producing a carbon membrane of the present invention will specifically be described. The production method of a carbon membrane structure of the present embodiment is a carbon membrane production method including a membrane-forming step of forming a membrane made from a precursor solution on the surfaces of the cells by passing the precursor solution for forming a carbon membrane through a cylindrical porous support body provided with a plurality of cells extending from one end face to the other end face and functioning as fluid passages, a drying step of subjecting the membrane made from the precursor solution to draught drying by hot wind, and a carbonizing step of forming a carbon membrane by carbonizing the dried membrane; wherein in the membrane-forming step is used the porous support body selectively formed so that a distance L from one cell to another cell adjacent to the one cell in a cross section perpendicular to a cell extension direction of the porous support body is 0.60 mm or more.

(2-1) Production of Porous Support Body:

The carbon membrane structure production method of the present embodiment includes the aforementioned membrane-forming step, drying step, and carbonizing step. In the membrane-forming step, it is important to use a specific porous support body, that is, a porous support body selectively formed so that the distance L to another cell adjacent to one cell is 0.60 mm or more. Here will be described a method for producing a specific porous support body designed in such a manner that the distance between cells is 0.60 mm or more.

Regarding a production method of the porous support body, the porous support body can be produced according to the production method of a conventionally known porous monolith-shaped substrate. In the carbon membrane structure production method of the present embodiment, the arrangement of the cells formed in the porous support body is determined by designing the arrangement of the cells of the porous support body so that the distance L from one cell to another cell adjacent to the one cell is 0.60 mm or more.

As a more specific production method, in the first place, a binder, a surfactant, and a pore former as necessary are mixed with a ceramic powder (raw material powder) as a material for forming a porous support body, and water as a dispersion medium is further added, and the mixture is kneaded to obtain a kneaded material having plasticity. Incidentally, examples of the dispersion medium include methyl cellulose and hydroxypropoxylmethyl cellulose. As the surfactant, ethylene glycol, dextrin, fatty acid soap, polyalcohol, and the like can be mentioned. These may be used alone or in combination of two or more kinds. There is no particular limitation on the pore former contained as necessary as long as it forms pores after firing, and examples include starch, resin balloon, water-absorbing resin, silica gel, carbon, and the like.

Next, the kneaded material obtained above is subjected to extrusion using a predetermined die to form a monolith formed body having a desired shape. The formed body is designed so that the aforementioned distance L between cells is preferably 0.60 to 5.00 mm, more preferably 0.80 to 2.00 mm when a carbon membrane structure is obtained through drying and firing and further through forming, drying, and carbonizing the carbon membrane. Such constitution enables to produce a carbon membrane structure showing very excellent separation performance by the carbon membrane.

Next, the monolith formed body obtained above is dried and further fired to produce a monolith-shaped porous support body. There is no particular limitation on the method for drying the monolith formed body, and, examples of the method include an electromagnetic wave heating method such as microwave heat-drying and high-frequency dielectric heat-drying and an external heating method such as hot air drying and superheated steam drying. For example, it is also preferable that, after a certain amount of moisture is dried by an electromagnetic wave heating method, the remaining moisture is dried by an external heating method in that the entire forming body can be dried quickly and uniformly without causing a crack.

Before firing the dried monolith formed body, calcination may be performed. The calcination is performed for degreasing, and it is performed, for example, at 550° C. for about 3 hours in an oxidization atmosphere. However, the calcination is not limited to this, and calcination is preferable according to the organic matter (binder, dispersant, pore former, etc.) in the monolith formed body. Generally, combustion temperature of a binder is about 100 to 300° C., and combustion temperature of a pore former is 200 to 800° C. Therefore, the calcination temperature may be about 200 to 1000° C. Though there is no particular limitation on the calcination time, it is generally about 3 to 100 hours.

The firing (main firing) is a heating step for sintering the forming raw material for densification in order to secure predetermined strength. Since the firing conditions (temperature and time) are different depending on the kind of the forming raw material, suitable conditions may be selected according to the kind. For example, in the case of firing a cordierite raw material, it is preferable to fire it at 1410 to 1440° C. It is also possible to employ firing only once by unifying the calcination and the main firing. Thus, a porous support body having a predetermined shape can be produced.

Next, a glass paste is applied to both the end faces of the porous support body produced in such a manner, and it is heated at predetermined temperature to form a sealing portion. There is no particular limitation on the portion where the glass paste is applied, and it is preferable to apply it to the portion where movement of gas, liquid, and microparticles from the inside of the porous support body to the outside or from the outside to the inside of the porous support body on the surface of the porous support body is tried to be inhibited.

Here, a porous support body used for the carbon membrane structure production method of the present embodiment may be provided with a slit in the direction perpendicular to the longitudinal direction (cell extension direction) of the porous support body. Since this structure enables to discharge the component separated in the cells near the central portion of the substrate quickly, it is possible to increase the permeation amount in the entire carbon membrane structure and improve the permeation amount. Here, regarding the cells cut away so as to communicate with the external space, it is necessary to seal the opening at the substrate edge end airtightly. This enables to inhibit the solution to be treated from being mixed into the permeated solution. The sealing of the cell can be performed by, for example, a method where, after plugging members made of the same material as that for the substrate is filled into the end portions of the cells, the end face of the substrate is covered with a glass paste and fired for the sealing. The plugging members and the member for the sealing may employ the same material. The formation of the slit may be performed after forming a sealed portion by the application of the glass paste.

(2-2) Membrane-Forming Step:

Next, the porous support body is subjected to a membrane-forming step for forming a membrane (resin layer) made from a precursor solution for forming a separation membrane. In the membrane-forming step, as a method for passing the precursor solution through the cells of the porous support body, a method where the application is uniform may be employed. Though it is not particularly limited, an example of a suitable method is the dipping membrane formation.

As the precursor solution used in the membrane-forming step, there can be used a "precursor to form a carbon membrane by thermal decomposition" described above. For example, in the case of using a polyamide acid solution, it is possible to use a solution obtained by dissolving polyamide acid as a precursor of polyimide resin in an appropriate organic solvent such as N-methyl-2-pyrrolidone (NMP) or N,N-dimethylacetamide (DMAc). Though there is no particular limitation on the concentration of the polyamide acid in the polyamide acid solution, it is preferably 1 to 20 mass % from the viewpoint of allowing the solution to have a viscosity where a membrane can easily be formed. For example, in the case of using a phenol resin solution, it is possible to use a solution obtained by dissolving a phenol resin powder in an appropriate organic solvent such as N-methyl-2-pyrrolidone (NMP) or ethanol. Though there is no particular limitation on the concentration of the phenol resin in the phenol resin solution, it is preferably 1 to 20 mass % from the viewpoint of allowing the solution to have a viscosity where a membrane can easily be formed.

For example, in the case of forming membrane by the use of a polyamide acid solution or a phenol resin solution, as a method for passing the polyamide acid solution and a phenol resin solution through the cells of the porous support body, there can be employed, for example, a dip membrane formation where the polyamide acid solution is sent into each cell at a rate of 0.3 to 300 cm/min. from an opening end of each cell by the use of a solution-sending pump. It is preferable to form a membrane by putting it in a casing, making airtight by a glass sealing portion, and applying a pressure by gas such as air from the outer peripheral face of the porous support body in order to inhibit adhesion of the polyamide acid solution or the phenol resin solution in the portion other than the surfaces of the cells.

(2-3) Drying Step:

After the membrane is thus formed, it is preferable to dry the polyamide acid membrane or the phenol resin membrane by draught drying. By drying the polyamide acid membrane or the phenol resin membrane by draught drying, evaporation of, for example, NMP as the solvent from the surface of the membrane in contact with the draught gas (hot air) is accelerated, and the polyamide acid or the phenol resin is concentrated on the surface of the membrane and densified. Therefore, the polyamide acid membrane or the phenol resin membrane can be produced uniformly and densely without unevenness on the entire surfaces of the cells.

Next, by subjecting the dried polyamide acid membrane or phenol resin membrane to imidization or insolubilization by drying at 200 to 400° C. in a drier to form a polyimide membrane as the precursor of a carbon membrane in the case of the polyamide acid membrane or an insolubilized membrane in the case of the phenol resin membrane. Generally, heating at 200° C. or more is necessary for the imidization reaction of polyamide acid. The imidization method and the insolubilization method may be draught drying.

(2-4) Carbonization Step:

Next, the polyimide membrane or phenol resin membrane as the precursor for the carbon membrane is carbonized by thermal decomposition in a temperature range of about 400 to 1000° C. in a vacuum or an oxygen-inert atmosphere such as a nitrogen atmosphere or an argon atmosphere to form a carbon membrane. Thus, a carbon membrane structure of the present invention can be produced. The method for forming the carbon membrane is an example, and a carbon membrane can be formed on the porous support body by a conventionally known carbon membrane-forming method.

In the aforementioned thermal decomposition, when the carbonization is performed at temperature of below 400° C., the polyimide membrane or phenol resin membrane cannot be carbonized sufficiently, and the selectivity as a molecular sieve membrane and the permeation rate may fall. On the other hand, when the carbonization is performed at temperature of above 1000° C., the pore diameter may shrink to reduce the permeation rate. Incidentally, the oxygen-inert atmosphere means an atmosphere where the precursor for forming a carbon membrane is not oxidized even by heating in the aforementioned temperature range and, specifically, an atmosphere in inert gas such as nitrogen or argon, in a vacuum, or the like.

EXAMPLE

Hereinbelow, the present invention will be described in more detail on the basis of Examples. However, the present invention is by no means limited to these Examples.

Example 1

Production of Porous Support Body

The porous support body passed through the formation by extrusion and the firing to produce a monolith-shaped alumina porous substrate having an average pore size of 20 μm and a porosity of 40%. Then, an alumina intermediate layer having a thickness of 150 μm was formed on the inner wall faces of the cells in the substrate obtained above. Then, on the intermediate layer, an alumina surface layer having a thickness of 10 μm and an average pore size of 0.1 μm was formed to obtain a porous support body. In Example 1, 55 cells having a diameter of 2.80 mm were formed, and the length of the gap L between adjacent cells was 0.60 mm. The aforementioned "gap L between adjacent cells" means the distance L from one cell to another cell adjacent to the one cell (see, e.g., FIG. 2B) and shortest distance between the one cell and another cell adjacent to the one cell. In Example 1, the outer diameter of the porous support body was 30 mm, and the length in the cell extension direction was 160 mm. A glass paste was applied to both the end faces of the porous support body produced in this manner and fired at 950° C. for three hours to form a sealing portion for airtight sealing.

<Production of Carbon Membrane>

In the first place, there was prepared a solution (precursor solution) obtained by diluting a commercially available polyimide-based resin ("U-varnish A (trade name)" produced by Ube Industries, Ltd.) to have a polyamide acid ratio of 1 to 20 mass % with N-methyl-2-pyrrolidone (NMP) as a solvent. The viscosity at this time was 3 to 5000 mPa·s at 25° C.

Next, the aforementioned precursor solution is subjected to dip coating on the inner faces of the cells of the porous support body produced by the aforementioned method to form a coating layer. Then, after warm air is sent into the cells of the porous support body to dry a large portion of the solvent of the precursor solution, drying was performed at 300° C. for one hour in the atmosphere in the drier. The steps are repeated several times (four times in Example 1) to form a resin layer on the inner face of each cell of the porous support body. The porous support body having the resin layer formed therein was subjected to a thermal treatment (temperature rise rate of 25° C./hr.) at 700° C. for five hours in a vacuum atmosphere to carbonize the resin layer, thereby forming a carbon membrane on the inner face of each cell of the porous support body to produce a carbon membrane structure. Table 1 shows constitution of the carbon membrane structure.

Figure 13:
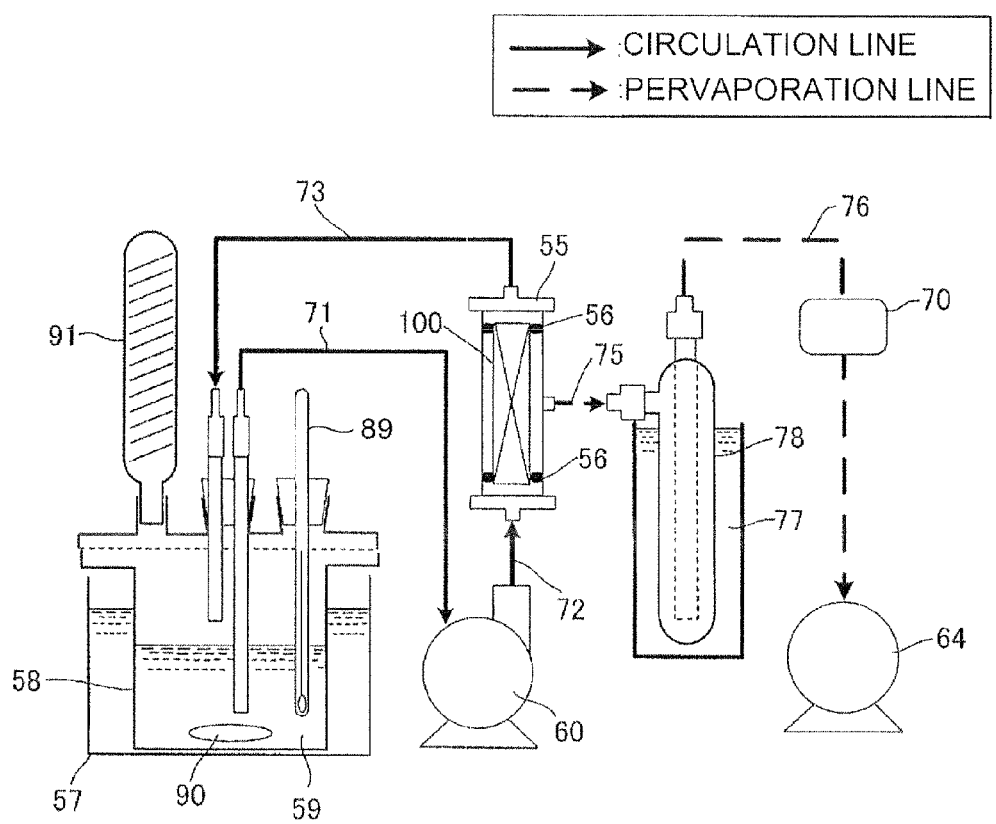
FIG. 13 is a plan view schematically showing a constitution of a pervaporation apparatus used for the evaluation on separation performance of a carbon membrane in Examples.

The evaluation on separation performance of the carbon membrane of the carbon membrane structure obtained above was performed by the following method. The evaluation on separation performance of the carbon membrane was performed by the use of a pervaporation apparatus as shown in FIG. 13.

<Evaluation on Separation Performance of Carbon Membrane>

The carbon membrane structure 100 was housed in a cylindrical container 55, and the gap between the structure 100 and the inner peripheral face of the container 55 was sealed with the sealing material 56 at the outer peripheral portions of both the ends of the carbon membrane structure 100. A feed solution 59 warmed to have a predetermined temperature in a beaker 58 housed in a constant-temperature tank 57 was circulated in the circulation lines 71 to 73 by a circulation pump 60 to pass through the cells in the carbon membrane structure 100 of the container 55 disposed in the middle of the circulation lines.

While the feed liquid 59 was brought into contact with the carbon membrane formed on the surface of each cell of the carbon membrane structure 100, pressure outside the carbon membrane structure 100 on the permeation side was reduced (reduced pressure adjustment) through the pervaporation lines 75, 76 by a vacuum pump 64 while adjusting the secondary side pressure by the use of a vacuum controller 70. The permeated steam passed through the carbon membrane was trapped as a permeated solution by a cooling trap 78 immersed in the liquid nitrogen 77 on the pervaporation line.

In FIG. 13, the mark 89 is a thermometer for measuring temperature of the feed solution 59, the mark 90 is a stirrer for stirring the feed solution 59, and the mark 91 is a cooling tube attached at the top of the beaker 58. A water/ethanol mixed solution having a water/ethanol ratio (mass ratio) of 50/50 was used as the feed solution 59, and the secondary side pressure is reduced to 6.67 kPa by the vacuum controller 70 with the temperature of the feed solution being 50° C. to evaluate water/ethanol separation performance of the carbon membrane. A pervaporation test was performed with the apparatus. A liquefied material of the permeated steam collected by the liquid nitrogen trap was subjected to a gravimeter, and concentration conversion was performed to determine the composition of the permeation stream to evaluate the performance of the membrane.

In the evaluation on the separation performance, there were used a water/ethanol separation coefficient α shown by the following formula (1) and permeation flux (Flux (kg/m²·h)) shown by the following formula (2). Incidentally, the separation coefficient is defined as the permeation side solution composition ratio to the supply side solution composition ratio. In the following formula (1), Perm (water) and Perm (ethanol) mean mass concentrations (mass %) of water and ethanol passed through the membrane, respectively. Feed (water) and Feed (ethanol) mean mass concentrations (mass %) of water and ethanol, respectively, of the feed solution.

$$\alpha = (\text{Perm(water)}/\text{Perm(ethanol)})/(\text{Feed(water)}/\text{Feed(ethanol)}) \quad (1)$$

$$\text{Flux} = Q/(A \cdot t) \quad (2)$$

(In the above formula (2), Q denotes permeated solution mass (kg), A denotes area (m²) of the carbon membrane, and t denotes hour (h).)

Examples 2 to 34

Production of Porous Support Body

<Production of Carbon Membrane>

A carbon membrane structure was produced in the same manner as in Example 1 except that the distance between cells (mm) (the distance between cells means the distance L from one cell to another cell adjacent to the one cell), the membrane formation number (times), the polyamide acid concentration (mass %), the viscosity (mPa·s), the monolith external shape, the cell shape, the cell pitch (mm), the cell diameter (mm), the cell number (cells), and the cell arrangement were changed as shown in Tables 1 to 7 to make an evaluation on the separation performance of each carbon membrane. The evaluation results are shown in Tables 10 to 18. The cell pitch (mm) means the distance between the centers of adjacent cells. In Tables 1 to 7, a figure corresponding to the shape of the carbon membrane structure is shown as "corresponding figure of the carbon membrane structure", and the carbon membrane structure having a shape shown in the figure was used. Regarding the monolith external shape of each of Examples 21 and 22, a cross section perpendicular to the cell extension direction has a side length of 30 mm.

In Examples 19 and 20, slits as shown in FIGS. 7A and 7B were formed in the porous support body. Specifically, slit-shaped gaps were formed by cutting away a part of the plural cell rows so that a part of the cells might communicate with the external space. The slits were formed by cutting away cell rows with an electrodeposited diamond cutter after the firing of the porous support body so as to communicate with the external space. The cells of slit-formed rows were airtightly sealed with a plugging member at the openings at the substrate edge end in order to inhibit the solution from being mixed into the filtered solution. Then, the sealing was performed by melting the aforementioned glass.

<Evaluation on Separation Performance of Carbon Membrane>

In Examples 31 to 34, the feed solution 59 (see FIG. 13) was changed, and an ethanol/n-octane/o-xylene mixed solution having an ethanol/n-octane/o-xylene ratio (mass ratio) of 33.3/33.3/33.3 was used. The temperature of the feed solution was controlled to 50° C., the secondary side pressure was reduced to 50 Pa by the vacuum controller 70, and ethanol/n-octane/o-xylene separation performance of the carbon membrane was evaluated. A pervaporation test was performed with the apparatus. A liquefied material of the permeated steam collected by the liquid nitrogen trap was subjected to gas chromatography analysis, and the composition of the permeation stream was determined to evaluate the performance of the membrane.

In the evaluation on the separation performance, there were used the ethanol/(n-octane+o-xylene) separation coefficient α shown by the following formula (3) and the permeated flux (Flux (kg/m²·h)) shown by the following formula (4). Incidentally, the separation coefficient is defined as the permeation side solution composition ratio to the supply side solution composition ratio. In the following formula (3), Perm (ethanol), Perm (n-octane), and Perm (o-xylene) mean mass concentrations (mass %) of ethanol, n-octane, and o-xylene passed through the membrane, respectively. Feed (ethanol), Feed (n-octane), and Feed (o-xylene) mean mass concentrations (mass %) of ethanol, n-octane, and o-xylene, respectively, of the feed solution.

$$\alpha=[Perm(ethanol)/[Perm(n-octane)+Perm(o-xylene)]]/[Feed(ethanol)/\{Feed(n-octane)+Feed(o-xylene)\}] \quad (3)$$

$$Flux=Q/(A \cdot t) \quad (4)$$

(In the above formula (4), Q denotes permeated liquid mass (kg), A denotes area (m²) of the carbon membrane, and t denotes hour (h).)

Examples 35 to 40

Production of Porous Support Body

In Example 35, the porous support body was produced in the same manner as in Example 1. In Example 35, 55 cells having a diameter of 2.80 mm were formed, and the length of the gap L between adjacent cells was 0.60 mm. In Example 35, the outer diameter of the porous support body was 30 mm, and the length in the cell extension direction was 160 mm. A glass paste was applied to both the end faces of the porous support body produced in this manner and fired at 950° C. for three hours to form a sealing portion, thereby sealing airtightly.

In Example 36, there was produced a porous support body in the same manner as in Example 35 except that the distance (mm) between cells and the cell diameter (mm) were changed as shown in Table 8.

In Examples 37 to 40, slits as shown in FIGS. 7C and 7D were formed in the porous support body. Specifically, slit-shaped gaps were formed by cutting away a part of the plural cell rows so that a part of the cells might communicate with the external space. The slits were formed with an electrodeposited diamond cutter after the firing of the porous support body so that the cell rows to form slits might communicate with the external space. The cells of slit-formed rows were airtightly sealed with a plugging member at the openings at the substrate edge end in advance in order to inhibit the solution from being mixed into the filtered solution.

<Production of Carbon Membrane>

There was prepared a solution (precursor solution) obtained by diluting a commercially available microparticle phenol-based resin powder ("Bellpearl S899 (trade name)" produced by Air Water Inc.) to have a phenol resin ratio of 1 to 20 mass % with employing N-methyl-2-pyrrolidone (NMP) as a solvent. The viscosity at this time was 1.0 mPa·s to 11.5 mPa·s at 25° C.

Next, the aforementioned precursor solution is subjected to dip coating on the inner faces of the cells of the porous support body produced by the aforementioned method to form a coating layer. Then, after warm air is sent into the cells of the porous support body to dry a large portion of the solvent of the precursor solution, drying was performed at 300° C. for one hour in the atmosphere in the drier. The steps are repeated several times (five times in Example 35) to form a resin layer on the inner face of each cell of the porous support body. The porous support body having the resin layer formed therein was subjected to a thermal treatment (temperature rise rate of 300° C./hr.) at 550° C. for one hour in a vacuum atmosphere to carbonize the resin layer, thereby forming a carbon membrane on the inner face of each cell of the porous support body to produce a carbon membrane structure. Each of Tables 8 and 9 shows constitution of the carbon membrane structure.

Next, in Examples 37 to 40, the carbon membranes obtained were subjected to an oxidation-heat treatment. The oxidation-heat treatment means that the carbon membranes were maintained in a heating furnace where mixed gas containing oxidizing gas is circulated. The oxidation-heat treatment was performed by putting the carbon membrane structure having a carbon membrane formed therein in the heating furnace. As the mixed gas in Examples 37 to 40, air was used. The temperature of the oxidation-heat treatment was 350° C., and the time was one hour.

<Evaluation on Separation Performance of Carbon Membrane>

The evaluation on separation performance of the carbon membrane of the carbon membrane structure obtained above was performed by the following method. The evaluation on separation performance of the carbon membrane was performed by the use of a pervaporation apparatus as shown in FIG. 13.

In Example 35 and 36, the water/ethanol separation performance of the carbon membranes was evaluated in the same manner as in Example 1. The evaluation results are shown in Table 19.

In the evaluation on the separation performance, there were used a water/ethanol separation coefficient α shown by the following formula (1) and permeated flux (Flux (kg/m²·h)) shown by the following formula (2).

In Examples 37 to 40, the ethanol/n-octane/o-xylene separation performance of the carbon membranes was evaluated in the same manner as in Examples 31 to 34. The evaluation results are shown in Table 20.

In the evaluation on the separation performance, there were used an ethanol/(n-octane+o-xylene) separation coefficient α shown by the following formula (3) and permeated flux (Flux (kg/m²·h)) shown by the following formula (4).

Comparative Examples 1 to 28

A carbon membrane structure was produced in the same manner as in Example 1 except that the distance between cells (mm) the membrane formation number (times), the polyamide acid concentration (mass %), phenol resin concentration (mass %), the viscosity (mPa·s), the monolith external shape, the cell shape, the cell pitch (mm), the cell diameter (mm), the cell number (cells), and the cell arrangement were changed as shown in Tables 1 to 9 to make an evaluation on the separation performance of each carbon membrane. The evaluation results are shown in Tables 10 to 20. In Comparative Examples 11, 12, 27, and 28, slits were formed in each porous support body in the same manner as in Examples 19, 20, and 37 to 40.

TABLE 1

|  | Example 1 | Example 2 | Example 3 | Example 4 | Example 5 | Example 6 | Example 7 | Example 8 | Comp. Ex. 1 | Comp. Ex. 2 |
|---|---|---|---|---|---|---|---|---|---|---|
| Distance between cells (mm) | 0.60 | 0.70 | 0.80 | 0.90 | 1.50 | 2.00 | 5.00 | 2.80 | 0.40 | 0.50 |
| Membrane formation number (times) | | | | | 4 | | | | | |
| Polyamide acid concentration (mass %) | | | | | 5 | | | | | |
| Viscosity (mPa·s) | | | | | 12 | | | | | |
| Monolith external shape | | | | | Circle | | | | | |
| Cell shape | | | | | Circle | | | | | |
| Cell pitch (mm) | | | | 3.40 | | | 6.80 | | 3.40 | |
| Cell diameter (mm) | 2.80 | 2.70 | 2.60 | 2.50 | 1.90 | 1.40 | 1.80 | 4.00 | 3.00 | 2.90 |
| Cell number (cells) | | | | 55 | | | 19 | | 55 | |
| Cell arrangement | | | | | Staggered pattern | | | | | |
| Slit | | | | | None | | | | | |
| Figure corresponding to carbon membrane structure | | | | FIG. 2A | | | FIG. 12A | | FIG. 2A | |
| Oxidation-heat treatment | | | | | None | | | | | |
| Evaluation liquid | | | | | Water/ethanol | | | | | |

TABLE 2

|  | Example 9 | Example 10 | Example 11 | Example 12 | Comp. Ex. 3 | Comp. Ex. 4 |
|---|---|---|---|---|---|---|
| Distance between cells (mm) | 0.60 | 0.70 | 0.80 | 0.90 | 0.40 | 0.50 |
| Membrane formation number (times) | | | 4 | | | |
| Polyamide acid concentration (mass %) | | | 5 | | | |
| Viscosity (mPa·s) | | | 12 | | | |
| Monolith external shape | | | Circle | | | |
| Cell shape | | | Circle | | | |
| Cell pitch (mm) | 3.10 | 3.20 | 3.30 | 3.40 | 2.90 | 3.00 |
| Cell diameter (mm) | | | 2.50 | | | |
| Cell number (cells) | | | 55 | | | |
| Cell arrangement | | | Staggered pattern | | | |
| Slit | | | None | | | |
| Figure corresponding to carbon membrane structure | | | FIG. 2A | | | |
| Oxidation-heat treatment | | | None | | | |
| Evaluation liquid | | | Water/ethanol | | | |

TABLE 3

|  | Example 13 | Example 14 | Comp. Ex. 5 | Comp. Ex. 6 | Example 15 | Example 16 | Comp. Ex. 7 | Comp. Ex. 8 |
|---|---|---|---|---|---|---|---|---|
| Distance between cells (mm) | 0.60 | 0.70 | 0.40 | 0.50 | 0.60 | 0.70 | 0.40 | 0.50 |
| Membrane formation number (times) | 3~7 | 3~7 | 3~7 | 3~7 | | 4 | | |
| Polyamide acid concentration (mass %) | | 5 | | | 1, 3, 5, 10, 15, 20 | 1, 3, 5, 10, 15, 20 | 1, 3, 5, 10, 15, 20 | 1, 3, 5, 10, 15, 20 |
| Viscosity (mPa·s) | | 12 | | | 3, 6, 12, 158, 800, 5000 | 3, 6, 12, 158, 800, 5000 | 3, 6, 12, 158, 800, 5000 | 3, 6, 12, 158, 800, 5000 |
| Monolith external shape | | Circle | | | | Circle | | |
| Cell shape | | Circle | | | | Circle | | |
| Cell pitch (mm) | | 3.40 | | | | 3.40 | | |
| Cell diameter (mm) | 2.80 | 2.70 | 3.00 | 2.90 | 2.80 | 2.70 | 3.00 | 2.90 |

TABLE 3-continued

|  | Example 13 | Example 14 | Comp. Ex. 5 | Comp. Ex. 6 | Example 15 | Example 16 | Comp. Ex. 7 | Comp. Ex. 8 |
|---|---|---|---|---|---|---|---|---|
| Cell number (cells) | colspan 55 | | | | colspan 55 | | | |
| Cell arrangement | Staggered pattern | | | | Staggered pattern | | | |
| Slit | None | | | | None | | | |
| Figure corresponding to carbon membrane structure | FIG. 2A | | | | FIG. 2A | | | |
| Oxidation-heat treatment | None | | | | None | | | |
| Evaluation liquid | Water/ethanol | | | | Water/ethanol | | | |

TABLE 4

|  | Example 17 | Example 18 | Comp. Ex. 9 | Comp. Ex. 10 | Example 19 | Example 20 | Comp. Ex. 11 | Comp. Ex. 12 | Example 21 | Example 22 | Comp. Ex. 13 | Comp. Ex. 14 |
|---|---|---|---|---|---|---|---|---|---|---|---|---|
| Distance between cells (mm) | 0.60 | 0.70 | 0.40 | 0.50 | 0.60 | 0.70 | 0.40 | 0.50 | 0.60 | 0.70 | 0.40 | 0.50 |
| Membrane formation number (times) | 4 | | | | 4 | | | | 4 | | | |
| Polyamide acid concentration (mass %) | 5 | | | | 5 | | | | 5 | | | |
| Viscosity (mPa · s) | 12 | | | | 12 | | | | 12 | | | |
| Monolith external shape | Circle | | | | Circle | | | | Quadrangle | | | |
| Cell shape | Circle | | | | Circle | | | | Circle | | | |
| Cell pitch (mm) | 3.40 | | | | 3.40 | | | | 3.40 | | | |
| Cell diameter (mm) | 2.80 | 2.70 | 3.00 | 2.90 | 2.80 | 270 | 3.00 | 2.90 | 2.80 | 2.70 | 3.00 | 2.90 |
| Cell number (cells) | 32 | | | | 41 | | | | 39 | | | |
| Cell arrangement | Lattice pattern | | | | Staggered pattern | | | | Staggered pattern | | | |
| Slit | None | | | | Formed | | | | None | | | |
| Figure corresponding to carbon membrane structure | FIG. 5A | | | | FIG. 7A & FIG. 7B | | | | FIG. 6A & FIG. 6B | | | |
| Oxidation-heat treatment | None | | | | None | | | | None | | | |
| Evaluation liquid | Water/ethanol | | | | Water/ethanol | | | | Water/ethanol | | | |

TABLE 5

|  | Example 23 | Example 24 | Comp. Ex. 15 | Comp. Ex. 16 | Example 25 | Example 26 | Comp. Ex. 17 | Comp. Ex. 18 |
|---|---|---|---|---|---|---|---|---|
| Distance between cells (mm) | 0.60 | 0.70 | 0.40 | 0.50 | 0.60 | 0.70 | 0.40 | 0.50 |
| Membrane formation number (times) | 4 | | | | 4 | | | |
| Polyamide acid concentration (mass %) | 5 | | | | 5 | | | |
| Viscosity (mPa · s) | 12 | | | | 12 | | | |
| Monolith external shape | Circle | | | | Circle | | | |
| Cell shape | Quadrangle | | | | Quadrangle | | | |
| Cell pitch (mm) | 3.40 | | | | 3.40 | | | |
| Cell diameter (mm) | 2.80 | 2.70 | 3.00 | 2.90 | 2.80 | 2.70 | 3.00 | 2.90 |
| Cell number (cells) | 24 | | | | 25 | | | |
| Cell arrangement | Staggered pattern | | | | Lattice pattern | | | |
| Slit | None | | | | None | | | |
| Figure corresponding to carbon membrane structure | FIG. 8A & FIG. 8B | | | | FIG. 9A & FIG. 9B | | | |
| Oxidation-heat treatment | None | | | | None | | | |
| Evaluation liquid | Water/ethanol | | | | Water/ethanol | | | |

TABLE 6

|  | Example 27 | Example 28 | Comp. Ex. 19 | Comp. Ex 20 | Example 29 | Example 30 | Comp. Ex. 21 | Comp. Ex. 22 |
|---|---|---|---|---|---|---|---|---|
| Distance between cells (mm) | 0.60 | 0.70 | 0.40 | 0.50 | 0.60 | 0.70 | 0.40 | 0.50 |
| Membrane formation number (times) | 4 | | | | 4 | | | |
| Polyamide acid concentration (mass %) | 5 | | | | 5 | | | |
| Viscosity (mPa · s) | 12 | | | | 12 | | | |
| Monolith external shape | Circle | | | | Circle | | | |
| Cell shape | Hexagon | | | | Hexagon | | | |
| Cell pitch (mm) | 3.40 | | | | 3.40 | | | |
| Cell diameter (mm) | 2.80 | 2.70 | 3.00 | 2.90 | 2.80 | 2.70 | 3.00 | 2.90 |

TABLE 6-continued

|  | Example 27 | Example 28 | Comp. Ex. 19 | Comp. Ex 20 | Example 29 | Example 30 | Comp. Ex. 21 | Comp. Ex. 22 |
| --- | --- | --- | --- | --- | --- | --- | --- | --- |
| Cell number (cells) | 16 | | | | 19 | | | |
| Cell arrangement | Lattice pattern | | | | Staggered pattern | | | |
| Slit | None | | | | None | | | |
| Figure corresponding to carbon membrane structure | FIG. 10A & FIG. 10B | | | | FIG. 11A & FIG. 11B | | | |
| Oxidation-heat treatment | None | | | | None | | | |
| Evaluation liquid | Water/ethanol | | | | Water/ethanol | | | |

TABLE 7

|  | Example 31 | Example 32 | Example 33 | Example 34 | Comp. Ex. 23 | Comp. Ex. 24 |
| --- | --- | --- | --- | --- | --- | --- |
| Distance between cells (mm) | 0.60 | 0.70 | 0.80 | 0.90 | 0.40 | 0.50 |
| Membrane formation number (times) | | | 4 | | | |
| Polyamide acid concentration (mass %) | | | 5 | | | |
| Viscosity (mPa · s) | | | 12 | | | |
| Monolith external shape | | | Circle | | | |
| Cell shape | | | Circle | | | |
| Cell pitch (mm) | | | 3.40 | | | |
| Cell diameter (mm) | 2.80 | 2.70 | 2.60 | 2.50 | 3.00 | 2.90 |
| Cell number (cells) | | | 55 | | | |
| Cell arrangement | | | Staggered pattern | | | |
| Slit | | | None | | | |
| Figure corresponding to carbon membrane structure | | | FIG. 2A | | | |
| Oxidation-heat treatment | | | None | | | |
| Evaluation liquid | | | Ethanol/n-octane/o-xylene | | | |

TABLE 8

|  | Example 35 | Example 36 | Comp. Ex. 25 | Comp. Ex. 26 |
| --- | --- | --- | --- | --- |
| Distance between cells (mm) | 0.60 | 0.70 | 0.40 | 0.50 |
| Membrane formation number (times) | | 5 | | |
| Phenol resin concentration (mass %) | 1, 3, 5, 10, 15, 20 | 1, 3, 5, 10, 15, 20 | 1, 3, 5, 10, 15, 20 | 1, 3, 5, 10, 15, 20 |
| Viscosity (mPa · s) | 1, 2.5, 3.5, 6.2, 8.8, 11.5 | 1, 2.5, 3.5, 6.2, 8.8, 11.5 | 1, 2.5, 3.5, 6.2, 8.8, 11.5 | 1, 2.5, 3.5, 6.2, 8.8, 11.5 |
| Monolith external shape | | Circle | | |
| Cell shape | | Circle | | |
| Cell pitch (mm) | | 3.40 | | |
| Cell diameter (mm) | 2.80 | 2.70 | 3.00 | 2.90 |
| Cell number (cells) | | 55 | | |
| Cell arrangement | | Staggered pattern | | |
| Slit | | None | | |
| Figure corresponding to carbon membrane structure | | FIG. 2A | | |
| Oxidation-heat treatment | | None | | |
| Evaluation liquid | | Water/ethanol | | |

TABLE 9

|  | Example 37 | Example 38 | Example 39 | Example 40 | Comp. Ex. 27 | Comp. Ex. 28 |
| --- | --- | --- | --- | --- | --- | --- |
| Distance between cells (mm) | 0.60 | 0.70 | 0.80 | 0.90 | 0.40 | 0.50 |
| Membrane formation number (times) | | | 5 | | | |
| Phenol resin concentration (mass %) | | | 5 | | | |
| Viscosity (mPa · s) | | | 3.5 | | | |
| Monolith external shape | | | Circle | | | |
| Cell shape | | | Circle | | | |
| Cell pitch (mm) | | | 3.40 | | | |
| Cell diameter (mm) | 2.80 | 2.70 | 2.60 | 2.50 | 3.00 | 2.90 |
| Cell number (cells) | | | 55 | | | |

TABLE 9-continued

|  | Example 37 | Example 38 | Example 39 | Example 40 | Comp. Ex. 27 | Comp. Ex. 28 |
|---|---|---|---|---|---|---|
| Cell arrangement | Staggered pattern | | | | | |
| Slit | Formed | | | | | |
| Figure corresponding to carbon membrane structure | FIG. 7C & FIG. 7D | | | | | |
| Oxidation-heat treatment | Performed | | | | | |
| Evaluation liquid | Ethanol/n-octane/o-xylene | | | | | |

TABLE 10

|  | Comp. Ex. 1 | Comp. Ex. 2 | Example 1 | Example 2 | Example 3 |
|---|---|---|---|---|---|
| α | 2 | 3 | 11 | 12 | 13 |
| Flux (kg/m² · h) | 1.3 | 1.2 | 0.9 | 0.8 | 0.8 |

|  | Example 4 | Example 5 | Example 6 | Example 7 | Example 8 |
|---|---|---|---|---|---|
| α | 14 | 14 | 14 | 14 | 14 |
| Flux (kg/m² · h) | 0.8 | 0.8 | 0.8 | 0.8 | 0.8 |

TABLE 11

|  | Comp. Ex. 3 | Comp. Ex. 4 | Example 9 | Example 10 | Example 11 | Example 12 |
|---|---|---|---|---|---|---|
| α | 2 | 3 | 11 | 12 | 13 | 14 |
| Flux (kg/m² · h) | 1.3 | 1.2 | 0.9 | 0.8 | 0.8 | 0.8 |

TABLE 12

| Membrane formation (times) |  | Comp. Ex. 5 | Comp. Ex. 6 | Example 13 | Example 14 |
|---|---|---|---|---|---|
| 3 | α | Not separated | Not separated | 7 | 9 |
|  | Flux (kg/m² · h) | — | — | 1.0 | 0.9 |
| 4 | α | 2 | 3 | 11 | 12 |
|  | Flux (kg/m² · h) | 1.3 | 1.2 | 0.9 | 0.8 |
| 5 | α | 2 | 3 | 11 | 13 |
|  | Flux (kg/m² · h) | 1.3 | 1.1 | 0.9 | 0.8 |
| 6 | α | 3 | 4 | 12 | 14 |
|  | Flux (kg/m² · h) | 1.2 | 1.1 | 0.8 | 0.8 |
| 7 | α | 3 | 5 | 13 | 14 |
|  | Flux (kg/m² · h) | 1.2 | 1.0 | 0.8 | 0.8 |

TABLE 13

| Concentration (mass %) |  | Comp. Ex. 7 | Comp. Ex. 8 | Example 15 | Example 16 |
|---|---|---|---|---|---|
| 1 | α | Not measured | Not measured | 7 | 7 |
|  | Flux (kg/m² · h) | — | — | 1.0 | 1.0 |
| 3 | α | Not measured | Not measured | 8 | 8 |
|  | Flux (kg/m² · h) | — | — | 1.0 | 1.0 |
| 5 | α | 2 | 3 | 11 | 12 |
|  | Flux (kg/m² · h) | 1.3 | 1.2 | 0.9 | 0.8 |
| 10 | α | 3 | 5 | 14 | 14 |
|  | Flux (kg/m² · h) | 1.2 | 1.0 | 0.8 | 0.8 |
| 15 | α | 3 | 5 | 15 | 15 |
|  | Flux (kg/m² · h) | 1.1 | 1.0 | 0.8 | 0.8 |
| 20 | α | 3 | 5 | 15 | 15 |
|  | Flux (kg/m² · h) | 1.1 | 1.0 | 0.8 | 0.8 |

TABLE 14

|  | Comp. Ex. 9 | Comp. Ex. 10 | Example 17 | Example 18 |
|---|---|---|---|---|
| α | 2 | 3 | 11 | 13 |
| Flux (kg/m² · h) | 1.3 | 1.2 | 0.9 | 0.8 |

TABLE 15

|  | Comp. Ex. 11 | Comp. Ex. 12 | Example 19 | Example 20 |
|---|---|---|---|---|
| α | 2 | 3 | 11 | 12 |
| Flux (kg/m² · h) | 1.3 | 1.2 | 0.9 | 0.8 |

TABLE 16

|  | Comp. Ex. 13 | Comp. Ex. 14 | Example 21 | Example 22 |
|---|---|---|---|---|
| α | 2 | 3 | 11 | 12 |
| Flux (kg/m² · h) | 1.3 | 1.2 | 0.9 | 0.8 |

TABLE 17

|   | Comp. Ex. 15 | Comp. Ex. 16 | Example 23 | Example 24 | Comp. Ex. 17 | Comp. Ex. 18 | Example 25 | Example 26 |
| --- | --- | --- | --- | --- | --- | --- | --- | --- |
| α | 2 | 3 | 11 | 12 | 4 | 4 | 12 | 14 |
| Flux (kg/m² · h) | 1.3 | 1.2 | 0.9 | 0.8 | 1.1 | 1.1 | 0.8 | 0.8 |

|   | Comp. Ex. 19 | Comp. Ex. 20 | Example 27 | Example 28 | Comp. Ex. 21 | Comp. Ex. 22 | Example 29 | Example 30 |
| --- | --- | --- | --- | --- | --- | --- | --- | --- |
| α | 3 | 3 | 11 | 12 | 4 | 4 | 12 | 14 |
| Flux (kg/m² · h) | 1.2 | 1.2 | 0.9 | 0.9 | 1.1 | 1.1 | 0.8 | 0.8 |

TABLE 18

|   | Comp. Ex. 23 | Comp. Ex. 24 | Example 31 | Example 32 | Example 33 | Example 34 |
| --- | --- | --- | --- | --- | --- | --- |
| α | 2 | 2 | 6 | 6 | 6 | 7 |
| Flux (kg/m² · h) | 0.4 | 0.4 | 0.4 | 0.4 | 0.4 | 0.4 |

TABLE 19

| Concentration (mass %) |   | Comp. Ex. 25 | Comp. Ex. 26 | Example 35 | Example 36 |
| --- | --- | --- | --- | --- | --- |
| 1 | α | Not measured | Not measured | 7 | 7 |
|  | Flux (kg/m² · h) | — | — | 1.0 | 1.0 |
| 3 | α | Not measured | Not measured | 8 | 8 |
|  | Flux (kg/m² · h) | — | — | 1.0 | 1.0 |
| 5 | α | 2 | 3 | 10 | 11 |
|  | Flux (kg/m² · h) | 1.3 | 1.2 | 0.9 | 0.8 |
| 10 | α | 3 | 4 | 14 | 14 |
|  | Flux (kg/m² · h) | 1.2 | 1.0 | 0.8 | 0.8 |
| 15 | α | 3 | 5 | 15 | 15 |
|  | Flux (kg/m² · h) | 1.1 | 1.0 | 0.8 | 0.8 |
| 20 | α | 3 | 5 | 15 | 15 |
|  | Flux (kg/m² · h) | 1.1 | 1.0 | 0.8 | 0.8 |

TABLE 20

|   | Comp. Ex. 27 | Comp. Ex. 28 | Example 37 | Example 38 | Example 39 | Example 40 |
| --- | --- | --- | --- | --- | --- | --- |
| α | 2 | 2 | 6 | 7 | 7 | 8 |
| Flux (kg/m² · h) | 1.8 | 1.8 | 1.8 | 1.8 | 1.8 | 1.8 |

The carbon membrane structures of the present Examples 1 to 40 were excellent in separation coefficient (α). On the other hand, Comparative Examples 1 to 28, where the distance L between cells was 0.40 mm or 0.50 mm, were inferior in separation coefficient (α) to the carbon membrane structures of the present Examples. Therefore, it was found out that a carbon membrane structure having excellent permeability can be obtained by setting the distance L between cells to 0.60 mm or more.

INDUSTRIAL APPLICABILITY

A carbon membrane structure of the present invention can be used as a separation membrane for separating a predetermined component from gas or liquid.

DESCRIPTION OF REFERENCE NUMERALS

1: porous support body, 2: cell, 2a: cell (one cell), 2b: cell (another cell adjacent to one cell), 10: carbon membrane, 11: one end face, 12: the other end face, 20: carbon membrane precursor, 20a: solution of carbon membrane precursor (precursor solution), 30: slit, 55: container, 56: sealing material, 57: constant-temperature bath, 58: beaker, 59: feed solution, 60: circulation pump, 64: vacuum pump, 70: vacuum controller, 71, 72, 73: circulation line, 75, 76: pervaporation line, 77: liquid nitrogen, 78: cooling trap, 89: thermometer, 90: stirrer, 91: cooling tube, 100A, 100B, 100C, 100D, 100E, 100F, 100G, 100H, 100I, 100J: carbon membrane structure, 101: porous support body, 102: cell, 102a: cell (one cell), 102b: cell (another cell adjacent to the one cell), 110: carbon membrane, 120a: precursor solution, 121: component of carbon membrane, L: distance from one cell to another cell adjacent to the one cell

The invention claimed is:

1. A carbon membrane structure comprising: a cylindrical porous support body provided with a plurality of cells extending from one end face to the other end face and functioning as fluid passages, and a carbon membrane disposed on the surface side of the cells formed in the porous support body;

wherein the plurality of cells are formed so that a distance L from one cell to another cell adjacent to the one cell in a cross section perpendicular to a cell extension direction of the porous support body is 0.60 mm or more, and wherein the porous support body comprises a support body having an average particle diameter of 10 to 100 μm and an average pore size of 1 to 30 μm, an intermediate layer formed on a surface of the support body having an average particle diameter of 0.3 to 10 μm and an average pore size of 0.1 to 3 μm, and a surface layer formed on a surface of the intermediate layer having an average particle diameter of 0.03 to 1 μm and an average pore size of 0.01 to 0.5 μm.

2. The carbon membrane structure according to claim 1, wherein the distance L from one cell to another cell adjacent to the one cell is 0.60 to 5.00 mm.

3. The carbon membrane structure according to claim 1, wherein the distance L from one cell to another cell adjacent to the one cell is 0.80 to 2.00 mm.

4. The carbon membrane structure according to claim 1, wherein the maximum diameter of an opening of each of the cells in a cross section perpendicular to a cell extension direction of the porous support body is 1.4 to 4.0 mm.

5. The carbon membrane structure according to claim 2, wherein the maximum diameter of an opening of each of the cells in a cross section perpendicular to a cell extension direction of the porous support body is 1.4 to 4.0 mm.

6. The carbon membrane structure according to claim 3, wherein the maximum diameter of an opening of each of the cells in a cross section perpendicular to a cell extension direction of the porous support body is 1.4 to 4.0 mm.

7. The carbon membrane structure according to claim 1, wherein the distances from one cell to other cells adjacent to the one cell are the same among the plurality of cells.

8. The carbon membrane structure according to claim 1, wherein the thickness of the carbon membrane is 0.01 to 2 μm.

9. The carbon membrane structure according to claim 7, wherein the thickness of the carbon membrane is 0.01 to 2 μm.

10. The carbon membrane structure according to claim 1, wherein at least a part of the carbon membrane is formed inside the porous substrate.

11. The carbon membrane structure according to claim 9, wherein at least a part of the carbon membrane is formed inside the porous substrate.

12. The carbon membrane structure according to claim 1, wherein the carbon membrane is formed by applying a carbon membrane precursor solution having a viscosity of 1 to 5000 mPa·s to surfaces of the cells of the porous support body, drying it, and then carbonizing it.

13. The carbon membrane structure according to claim 11, wherein the carbon membrane is formed by applying a carbon membrane precursor solution having a viscosity of 1 to 5000 mPa·s to surfaces of the cells of the porous support body, drying it, and then carbonizing it.

14. The carbon membrane structure according to claim 1, wherein the carbon membrane is formed by applying the carbon membrane precursor solution to surfaces of the cells of the porous support body, draught drying it, and then carbonizing it.

15. The carbon membrane structure according to claim 13, wherein the carbon membrane is formed by applying the carbon membrane precursor solution to surfaces of the cells of the porous support body, draught drying it, and then carbonizing it.

16. The carbon membrane structure according to claim 12, wherein the carbon membrane precursor solution contains at least one kind selected from the group consisting of polyimide resins and phenol resins.

17. The carbon membrane structure according to claim 13, wherein the carbon membrane precursor solution contains at least one kind selected from the group consisting of polyimide resins and phenol resins.

18. The carbon membrane structure according to claim 14, wherein the carbon membrane precursor solution contains at least one kind selected from the group consisting of polyimide resins and phenol resins.

19. The carbon membrane structure according to claim 15, wherein the carbon membrane precursor solution contains at least one kind selected from the group consisting of polyimide resins and phenol resins.

20. A method for producing a carbon membrane structure comprising:
   a membrane-forming step of forming a membrane made from a precursor solution on the surfaces of the cells by passing the precursor solution for forming a carbon membrane in a cylindrical porous support body provided with a plurality of cells extending from one end face to the other end face and functioning as fluid passages,
   a drying step of subjecting the membrane made from the precursor solution to draught drying by hot wind, and
   a carbonizing step of forming a carbon membrane by carbonizing the dried membrane;
   wherein in the membrane-forming step is used the porous support body selectively formed so that a distance L from one cell to another cell adjacent to the one cell in a cross section perpendicular to a cell extension direction of the porous support body is 0.60 mm or more, and
   wherein the porous support body comprises a support body having an average particle diameter of 10 to 100 μm and an average pore size of 1 to 30 μm, an intermediate layer formed on a surface of the support body having an average particle diameter of 0.3 to 10 μm and an average pore size of 0.1 to 3 μm, and a surface layer formed on a surface of the intermediate layer having an average particle diameter of 0.03 to 1 μm and an average pore size of 0.01 to 0.5 μm.

* * * * *

UNITED STATES PATENT AND TRADEMARK OFFICE
CERTIFICATE OF CORRECTION

PATENT NO. : 8,668,094 B2  
APPLICATION NO. : 13/613548  
DATED : March 11, 2014  
INVENTOR(S) : Shogo Takeno Page 1 of 1

It is certified that error appears in the above-identified patent and that said Letters Patent is hereby corrected as shown below:

Title Page, Item (56) References Cited

Foreign Patent Documents

Please change: "WO 2008/010432 A1 1/2008" to -- WO 2008/010452 A1 1/2008 --

Signed and Sealed this  
Tenth Day of June, 2014

Michelle K. Lee  
*Deputy Director of the United States Patent and Trademark Office*